(12) United States Patent
Lee et al.

(10) Patent No.: US 10,650,984 B2
(45) Date of Patent: May 12, 2020

(54) METAL OXIDE NANOSTRUCTURED MATERIAL AND AN ELECTROCHEMICAL CELL COMPRISING THE SAME

(71) Applicant: Nanyang Technological University, Singapore (SG)

(72) Inventors: Pooi See Lee, Singapore (SG); Xu Wang, Singapore (SG)

(73) Assignee: Nanyang Technological University, Singapore (SG)

( * ) Notice: Subject to any disclaimer, the term of this patent is extended or adjusted under 35 U.S.C. 154(b) by 219 days.

(21) Appl. No.: 15/537,710

(22) PCT Filed: Dec. 17, 2015

(86) PCT No.: PCT/SG2015/050495
§ 371 (c)(1),
(2) Date: Jun. 19, 2017

(87) PCT Pub. No.: WO2016/099403
PCT Pub. Date: Jun. 23, 2016

(65) Prior Publication Data
US 2018/0005771 A1    Jan. 4, 2018

(30) Foreign Application Priority Data
Dec. 19, 2014 (SG) .............................. 10201408549T

(51) Int. Cl.
*H01M 4/48* (2010.01)
*H01G 11/30* (2013.01)
(Continued)

(52) U.S. Cl.
CPC .............. *H01G 11/46* (2013.01); *B82Y 40/00* (2013.01); *C01B 13/366* (2013.01); *C01G 1/02* (2013.01);
(Continued)

(58) Field of Classification Search
CPC ........ B82Y 40/00; H01M 4/48; C01B 13/366; H01G 11/30; H01G 11/46; H01G 11/86;
(Continued)

(56) References Cited

U.S. PATENT DOCUMENTS

| 2006/0268492 A1 | 11/2006 | Yano et al. | |
| 2010/0019201 A1* | 1/2010 | Puppe | C01G 53/04 252/301.4 R |

FOREIGN PATENT DOCUMENTS

| CN | 1974013 A | 6/2007 |
| WO | 01/22507 A1 | 3/2001 |

OTHER PUBLICATIONS

Wang et al., "Orthorhombic niobium oxide nanowires for next generation hybrid supercapacitor device," Nano Energy 11: 765-772, 2014.*

(Continued)

*Primary Examiner* — Brittany L Raymond
(74) *Attorney, Agent, or Firm* — Seed IP Law Group LLP

(57) ABSTRACT

A method for preparing a niobium, titanium or vanadium metal oxide nanostructured material is provided. The method comprises providing an aqueous reagent comprising (i) a soluble metal oxalate, and/or (ii) oxalic acid and a metal oxide precursor, adding a buffering agent to the aqueous reagent to form a mixture, and heating the mixture under hydrothermal conditions to obtain the metal oxide nanostructured material. The metal oxide nanostructured material may also be doped with a dopant metal such as titanium to enhance capacity and cycling stability. An electrode comprising the metal oxide nanostructured material, and an electrochemical cell containing the electrode are also provided.

18 Claims, 10 Drawing Sheets

(51) Int. Cl.
  H01G 11/46    (2013.01)
  H01G 11/86    (2013.01)
  C01G 31/02    (2006.01)
  C01G 23/053   (2006.01)
  C01G 1/02     (2006.01)
  C01G 33/00    (2006.01)
  B82Y 40/00    (2011.01)
  C01B 13/36    (2006.01)

(52) U.S. Cl.
  CPC .......... *C01G 23/053* (2013.01); *C01G 31/02* (2013.01); *C01G 33/00* (2013.01); *H01G 11/30* (2013.01); *H01G 11/86* (2013.01); *H01M 4/48* (2013.01); *C01P 2002/54* (2013.01); *C01P 2002/72* (2013.01); *C01P 2004/60* (2013.01); *C01P 2004/80* (2013.01); *Y02E 60/13* (2013.01)

(58) Field of Classification Search
  CPC ........ C01G 1/02; C01G 23/053; C01G 31/02; C01G 33/00; C01P 2002/54; C01P 2004/60; C01P 2004/80; Y02E 60/13
  See application file for complete search history.

(56) References Cited

OTHER PUBLICATIONS

Lu et al., "High switching speed and coloration efficiency of titanium-doped vanadium oxide thin film electrochromic devices," J. Mater. Chem. C 1: 7380-7389, 2013.*

An et al., "High-Capacitance Supercapacitor Using a Nanocomposite Electrode of Single-Walled Carbon Nanotube and Polypyrrole, " J. Electrochem. Soc., vol. 149, Issue 8: A1058-A1062, 2002.*

Aravindan et al., "Constructing high energy density non-aqueous Li-ion capacitors using monoclinic $TiO_2$-B nanorods as insertion host," J. Mater. Chem. A 1: 6145-6151, 2013.

Augustyn et al., "High-rate electrochemical energy storage through $Li^+$ intercalation pseudocapacitance," Nat. Mater. 12: 518-522, 2013.

Brousse et al., "$TiO_2$ (B)/activated carbon non-aqueous hybrid system for energy storage," J. Power Sources 158: 571-577, 2006.

Bruce et al., "Nanomaterials for Rechargeable Lithium Batteries," Angew. Chem. Int. Ed. 47: 2930-2946, 2008.

Cao et al., "Li-ion capacitors with carbon cathode and hard carbon/stabilized lithium metal powder anode electrodes," J. Power Sources 213: 180-185, 2012.

Chen et al., "High-Performance Supercapacitors Based on Intertwined CNT/$V_2O_5$ Nanowire Nanocomposites," Adv. Mater. 23: 791-795, 2011.

Du Pasquier et al., "A comparative study of Li-ion battery, supercapacitor and nonaqueous asymmetric hybrid devices for automotive applications," J. Power Sources 115: 171-178, 2003.

Fan et al., "Asymmetric Supercapacitors Based on Graphene/$MnO_2$ and Activated Carbon Nanofiber Electrodes with High Power and Energy Density," Adv. Funct Mater. 21: 2366-2375, 2011.

Kim et al., "The Effect of Crystallinity on the Rapid Pseudocapacitive Response of $Nb_2O_5$," Adv. Energy Mater. 2: 141-148, 2012.

Lim et al., " Advanced Hybrid Supercapacitor Based on a Mesoporous Niobium Pentoxide/Carbon as High-Performance Anode," ACS Nano 8(9): 8968-8978, 2014.

Liu et al., "Advanced Materials for Energy Storage," Adv. Mater. 22: E28-E62, 2010.

Lu et al., "Atomic-scale investigation on lithium storage mechanism in $TiNb_2O_7$," Energy Environ. Sci. 4: 2638-2644, 2011.

Lu et al., "High switching speed and coloration efficiency of titanium-doped vanadium oxide thin film electrochromic devices," J.Mater. Chem. C 1: 7380-7386, 2013.

Nam et al., "Virus-Enabled Synthesis and Assembly of Nanowires for Lithium Ion Battery Electrodes," Science 312: 885-888, 2006. (6 pages).

Naoi et al., "High-rate nano-crystalline $Li_4Ti_5O_{12}$ attached on carbon nano-fibers for hybrid supercapacitors," J. Power Sources 195: 6250-6254, 2010.

Naoi et al., "Second generation 'nanohybrid supercapacitor': Evolution of capacitive energy storage devices," Energy Environ. Sci. 5: 9363-9373, 2012.

Ohzuku et al., "Electrochemistry of L-Niobium Pentoxide in a Lithium/Non-aqueous Cell," J. Power Sources 19: 287-299, 1987.

Power Storage Companies: Types of Alternative Power Storage Companies, Report, BCC Research, 2013, 128 pages.

Sathiya et al., "$V_2O_5$-Anchored Carbon Nanotubes for Enhanced Electrochemical Energy Storage," J. Am. Chem. Soc. 133: 16291-16299, 2011.

Saxman, Donald, Large and Advanced Battery Technology and Markets, Report, BCC Research, Wellesley, MA, Feb. 2013, Chap. 4, "Large-and-Advanced Battery Market Applications," pp. 104-180. (78 pages).

Simon et al., "Materials for electrochemical capacitors," Nat.Mater. 7: 845-854, 2008.

Snook et al., "Conducting-polymer-based supercapacitor devices and electrodes," J. Power Sources 196: 1-12, 2011.

Song et al., "Conducting Polyaniline Nanowire and Its Applications in Chemiresistive Sensing," Nanomaterials 3: 498-523, 2013.

Sumboja et al., "Nanoarchitectured current collector for high rate capability of polyaniline based supercapacitor electrode," Electrochimica Acta 65: 190-195, 2012.

Sumboja et al., "Investigation of Charge Transfer Kinetics of Polyaniline Supercapacitor Electrodes by Scanning Electrochemical Microscopy," Adv. Mater. Interfaces 2: 1400154, 2015. (8 pages).

Viet et al., "Nanostructured $Nb_2O_5$ Polymorphs by Electrospinning for Rechargeable Lithium Batteries," J. Phys. Chem. C. 114: 664-671, 2010.

Wang et al., "High-Performance Supercapacitors Based on Nanocomposites of $Nb_2O_5$ Nanocrystals and Carbon Nanotubes," Adv. Energy Mater. 1: 1089-1093, 2011.

Wang et al., "Dodecyl sulfate-induced fast faradic process in nickel cobalt oxide-reduced graphite oxide composited material and its application for asymmetric supercapacitor device," J. Mater. Chem. 22: 23114-23119, 2012.

Wang et al., "Enhancing electrochemical reaction sites in nickel-cobalt layered double hydroxides on zinc tin oxide nanowire: a hybrid material for an asymmetric supercapacitor device," Nanoscale 4: 7266-7272, 2012.

Wang et al., "Titanium doped niobium oxide for stable pseudocapacitive lithium ion storage and its application in 3 V non-aqueous supercapacitors," J. Mater. Chem. A 3: 21706-21712, 2015.

Wen et al., "Facile synthesis of $Nb_2O_5$ nanorod array films and their electrochemical properties," Appl. Surf. Sci. 257: 10084-10088, 2011.

Wu et al., "Investigation on $Ti_2Nb_{10}O_{29}$ anode material for lithium-ion batteries," Electrochem. Commun. 25: 39-42, 2012.

Yan et al., "Aniline Tetramer-Graphene Oxide Composites for High Performance Supercapacitors," Adv. Energy Mater. 4: 1400781, 2014. (7 pages).

Zhang et al., "Carbon-based materials as supercapacitor electrodes," Chem. Soc. Rev. 38: 2520-2531, 2009.

Zhao et al., "Nanostructured anode materials for Li-ion batteries," Pure Appl. Chem. 80(11): 2283-2295, 2008.

* cited by examiner (A)

(B)

(C)

(D)

(A)

(B)

(C)

METAL OXIDE NANOSTRUCTURED MATERIAL AND AN ELECTROCHEMICAL CELL COMPRISING THE SAME

CROSS-REFERENCE TO RELATED APPLICATION

This application claims the benefit of priority of Singapore patent application No. 10201408549T filed on 19 Dec. 2014, the content of which is incorporated herein by reference in its entirety for all purposes.

TECHNICAL FIELD

Various embodiments relate to a method for preparing a metal oxide nanostructured material, an electrode comprising the metal oxide nanostructured material, and an electrochemical cell comprising the electrode.

BACKGROUND

Electrochemical energy storage technologies constitute important research fields for use in a myriad of applications ranging from aerospace and military, to consumer use such as plug-in automobile power source, stationary energy storage, and cellphone battery.

Lithium ion batteries (LIBs) form an important class of electrochemical energy storage devices. Lithium ion batteries have high energy densities of about 100 Wh $kg^{-1}$ to about 200 Wh $kg^{-1}$, with power densities of up to about 100 W $kg^{-1}$. Energy storage mechanism of lithium ion batteries is associated with Faradic reaction between $Li^+$ and bulk electrode materials. Despite the high energy density of lithium ion batteries, slow $Li^+$ diffusion kinetics and poor reversibility of electrode reactions result in low power density and low cycling stability of lithium ion batteries of about 100 cycles.

Besides lithium ion batteries, supercapacitors belong to another class of important electrochemical energy storage devices, which provide transient but high power output for various machines and devices, such as trucks, buses, elevators as well as heavy duty construction machinery in powering forklifts and yard cranes, and in railways. Notably, supercapacitors have been used in electronics, transportation and energy applications with a market size of about 1.2 billion USD in 2015. Currently, there are about 51 major manufacturers in the world for supercapacitors.

Generally, supercapacitors possess high power delivery ability, high cycling stability of more than 100,000 cycles and high energy round trip efficiency of greater than 90%. Coupled with the almost non-existent geometric restriction or special requirement for supercapacitor cell installation, supercapacitors may provide great versatility and flexibility for energy storage markets.

Supercapacitors may generally be classified in the following two categories—electrical double layer capacitor (EDLC) and pseudocapacitor. Electrical double layer capacitor uses carbon-based materials, such as active carbon, templated carbon, carbon nanotubes, carbon aerogels, and graphene, as electrode materials, and energy storage is realized by reversible formation of electrical double layer at the electrode-electrolyte interface. High surface area carbon material is presently the dominant choice in industry. Electric double layer capacitors are already used in various applications, such as transportation, electronics, and energy. Maximum specific energy density of commercial electrical double layer capacitor device, however, may only reach a value in the range of about 5 Wh $kg^{-1}$ to about 10 Wh $kg^{-1}$ due to low capacitance of the carbon-based materials. Meanwhile, power density of electrical double layer capacitor may reach up to 10 kW $kg^{-1}$ with long term stability of over 10,000 cycles.

Pseudocapacitor, on the other hand, usually uses different metal oxides such as such as $MnO_x$, NiO, $Co_3O_4$, $V_2O_5$, or conducting polymers such as polyaniline, polypyrrole and related conjugated conducting polymer as electrode materials. Its energy storage mechanism is generally based on reversible faradic reaction in the near surface, which may be in the order of a few nanometers, of the material. As a result of the multi-electron electrochemical reaction, energy density of a pseudocapacitor may be much higher than that of an electrical double layer capacitor. Most studies are focused on pseudocapacitive material//carbon devices (so called asymmetric supercapacitor). The asymmetric supercapacitor may have an energy density of up to 40 Wh $kg^{-1}$, while power density may be lower than that of an electrical double layer capacitor.

Due to the low energy densities of supercapacitors, a great number of supercapacitor modules are required to store energy for use in applications, such as energy storage of electricity in a power grid during off-peak hours. This has restricted their use in industry due to high costs and space needed to accommodate the supercapacitors. The energy density of supercapacitors is required to double or triple to a range from about 20 Wh $kg^{-1}$ to about 30 Wh $kg^{-1}$ at a certain power density for various emerging applications so as to penetrate a larger energy storage market.

Lithium ion capacitors (LICs) form a new generation of supercapacitors, involving use of a lithium ion battery electrode and an electrical double layer capacitor electrode placed in an organic electrolyte. The lithium ion battery electrode may be a positive electrode, such as $LiCoO_2$, or $LiMnO_2$, or a negative electrode, such as graphite, $TiO_2$, or $Li_4Ti_5O_{12}$. As compared to traditional supercapacitors, operation potential of lithium ion capacitors may be greatly enhanced due to larger electrochemical reaction potential difference between the negative electrode and the positive electrode in the organic electrolyte. Furthermore, high capacity of the lithium ion battery electrode may promote energy density of the overall lithium ion capacitor. Generally, a lithium ion capacitor may have an energy density in the range from 40 Wh $kg^{-1}$ to 80 Wh $kg^{-1}$, and a power density of about 1 kW $kg^{-1}$. Cycling stability of the lithium ion capacitor may also be also superior to that of a lithium ion battery, and may reach up to a few thousand cycles.

Presently, electrical double layer capacitors, asymmetric supercapacitors, and lithium ion capacitors, form the three major technologies of electrical energy storage for large scale energy storage or as a small module for portable devices. As mentioned above, high surface area carbon-based material forms the essence in an electrical double layer capacitor device. As charge storage in electrical double layer capacitor involves charge adsorption/desorption in a surface of the carbon electrode, limitations exist in that carbon-based material has low capacitance. Though the carbon-based material is able to deliver high power density to the device, low capacity of the electrode in electrical double layer capacitor restricts overall device energy density. On the other hand, even though lithium ion batteries have high energy density, slow electrode kinetics limit power density of the device. Long term stability of the lithium ion batteries is also an issue. From the above discussion, it may be seen that limitations in state of the art technologies exist, and development of a device with both high energy density and high power density is of great value for broad applications.

In view of the above, there exists a need for an improved material that may be used in electrodes, as well as energy storage devices that overcome or at least alleviate one or more of the above-mentioned problems.

SUMMARY

In a first aspect, a method for preparing a metal oxide nanostructured material is provided. The method comprises
a) providing an aqueous reagent comprising (i) a soluble metal oxalate, and/or (ii) oxalic acid and a metal oxide precursor,
b) adding a buffering agent to the aqueous reagent to form a mixture, and
c) heating the mixture under hydrothermal conditions to obtain the metal oxide nanostructured material.

In a second aspect, a metal oxide nanostructured material prepared by a method according to the first aspect is provided.

In a third aspect, an electrode comprising a metal oxide nanostructured material prepared by a method according to the first aspect is provided.

In a fourth aspect, an electrochemical cell is provided. The electrochemical cell comprises an anode and a cathode, wherein the anode comprises a metal oxide nanostructured material prepared by a method according to the first aspect, and the cathode comprises a composite of an electrically conducting polymer and a carbon-based material.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1:
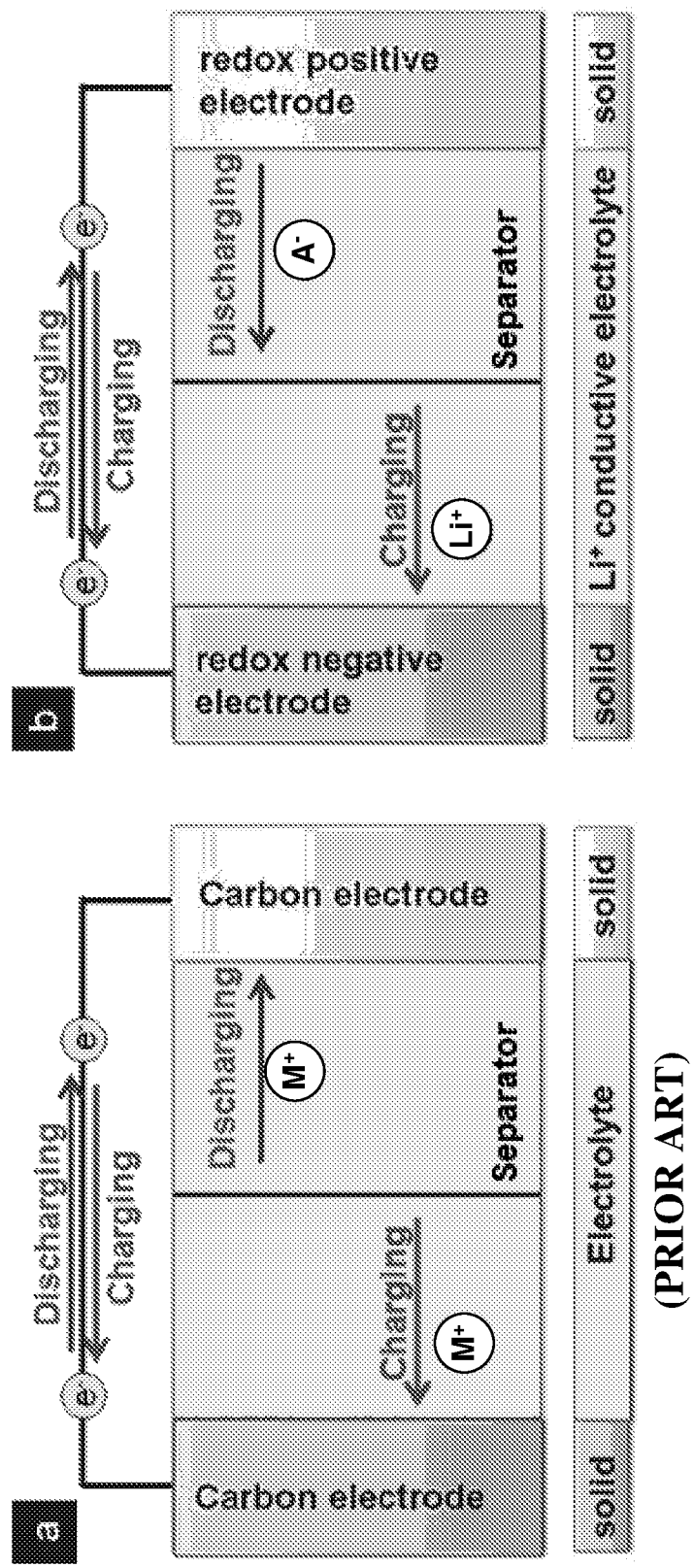
FIG. 1 shows (a) conventional electrical double layer capacitor (EDLC) supercapacitor device in market; and (b) proposed new electrode materials supercapacitor cell according to embodiments.

A metal oxide nanostructured material, and method for preparing the metal oxide nanostructured material are disclosed herein. The metal oxide nanostructured material, such as $Nb_2O_5$, may advantageously possess an orthorhombic crystal structure, which exhibits fast pseudocapacitive Li$^+$ storage based on intercalation pseudocapacitance in an electrochemical cell. The Li$^+$ diffusion has demonstrated fast kinetics in the bulk material providing superior rate performance. In various embodiments, the methods disclosed herein result in a highly stable orthorhombic phase $Nb_2O_5$ nanomaterial. Advantageously, the orthorhombic phase $Nb_2O_5$ nanomaterial may be doped with dopant metal such as titanium, or be coated with a layer of carbon to enhance capacity and cycling stability of pristine orthorhombic $Nb_2O_5$, while maintaining pseudocapacitive Li$^+$ ion storage behavior.

The metal oxide nanostructured material in its various forms may be used as an electrode in an electrochemical cell, such as a supercapacitor device, where it exhibited close to theoretical capacity. When used as a negative electrode, and in conjunction with a positive electrode comprising a composite of an electrically conductive polymer and a carbon-based material in an electrochemical cell, the electrodes may undergo redox reactions during energy storage and release, whereby pseudocapacitive reaction dominates in both electrode materials to provide a high rate performance. In various embodiments, a supercapacitor device with Nb$_2$O$_5$ as negative electrode and PANI as positive electrode is provided. From the manufacturing point of view, existing battery/EDLC manufacturing processes may be adopted for fabricating the supercapacitor device.

With the above in mind, various embodiments refer in a first aspect to a method for preparing a metal oxide nanostructured material.

The term "nanostructured material" as used herein refers to a material having at least one dimension that is in the nanometer range. At least one dimension of the nanostructured material may be less than 100 nm. In various embodiments, a nanostructured material has a dimension typically ranging from 1 nm to 100 nm (where 10 angstrom=1 nm ¹⁄₁₀₀₀ micrometer). Examples of nanostructured material may include nanotubes, nanoflowers, nanowires, nanofibers, nanoflakes, nanoparticles, nanodiscs, nanosheets, and combinations thereof.

In various embodiments, the metal oxide nanostructured material comprises or consists of nanorods and/or nanoflakes. In some embodiments, the metal oxide nanostructured material is in the form of nanorods.

In various embodiments, the metal oxide nanostructured material comprises an orthorhombic crystal structure.

In the context of a crystal structure, a unit cell is the simplest repeating unit defining the crystal structure, and comprises a space enclosed by points of a lattice defining the crystal structure. The unit cell may be specified by three vectors, a, b and c that form the edges of a parallelepiped. The lengths of a, b and c are called the unit cell dimensions, and their directions define the major crystallographic axes. The term "orthorhombic" as used herein refers to a crystal structure result from stretching a cubic lattice along two of its orthogonal pairs by two different factors, resulting in a rectangular prism with a rectangular base (a by b) and height (c), such that a, b, and c are distinct or different from each other. In other words, a≠b≠c. All three bases intersect at right angles or 90°, and the three lattice vectors remain mutually orthogonal.

Metal of the metal oxide nanostructured material may be a transition metal and which may be selected from the group consisting of niobium, titanium, vanadium, combinations thereof, and alloys thereof.

In specific embodiments, metal of the metal oxide nanostructured material is niobium.

The method comprises providing an aqueous reagent comprising (i) a soluble metal oxalate, and/or (ii) oxalic acid and a metal oxide precursor. The complex cation from the metal oxalate or the oxalate anion from the oxalic acid may function to provide a low supersaturation level of the aqueous reagent, such that upon an increase in pH, which may be brought about by addition of a buffering agent such as hexamethylenetetramine or urea to the aqueous reagent, the metal oxide nanostructured material disclosed herein may be formed in a controlled manner.

As used herein, the term "soluble metal oxalate" refers to a metal oxalate that is at least substantially soluble in an aqueous reagent. In solution, the metal oxalate may remain in a complex cation form. In various embodiments, the soluble metal oxalate is selected from the group consisting of niobium (V) oxalate, titanium oxalate, vanadium oxalate, ammonium niobium (V) oxalate, ammonium titanium oxalate, ammonium vanadium oxalate, potassium titanium oxide oxalate, and mixtures thereof. In specific embodiments, the soluble metal oxalate comprises or consists of niobium (V) oxalate.

In addition to or apart from the soluble metal oxalate, oxalic acid and a metal oxide precursor may be used.

The metal oxide precursor may be selected from the group consisting of metal halides, metal sulfates, metal acetates, metal alkoxides, metal nitrates, and combinations thereof. The metal of the metal oxide precursor may be a transition metal and which may be selected from the group consisting of niobium, titanium, vanadium, combinations thereof, and alloys thereof. In some embodiments, the metal oxide precursor comprises or consists of a metal halide. In specific embodiments, the metal oxide precursor comprises or consists of niobium chloride, which may be of formula NbCl$_5$.

Providing an aqueous reagent comprising oxalic acid and a metal oxide precursor may comprise dispersing the metal oxide precursor in an aqueous medium, followed by addition of the oxalic acid. The term "aqueous medium" as used herein refers to water or a solution based primarily on water.

In various embodiments, the aqueous medium comprises an alcohol that is at least substantially soluble in the aqueous medium. The alcohol may be added to adjust hydrolysis rate of the buffering agent. Suitable alcohols include, but are not limited to, methanol, ethanol, propanol, isopropanol, diethylene glycol, thiodiglycol, thiodiglycerol, and mixtures thereof. In specific embodiments, the aqueous medium comprises ethylene glycol. Accordingly, the metal oxide precursor may be dispersed in an aqueous medium comprising an alcohol that is at least substantially soluble in the aqueous medium such as ethylene glycol, followed by addition of the oxalic acid. The metal oxide precursor may be at least substantially soluble in the aqueous reagent, such that a clear solution may result.

In various embodiments, concentration of the metal ion from the metal oxide precursor in the aqueous reagent is in the range of about 20 mM to about 0.1 M. For example, concentration of the metal ion from the metal oxide precursor in the aqueous reagent may be in the range of about 30 mM to about 0.1 M, such as about 40 mM to about 0.1 M, about 50 mM to about 0.1 M, about 70 mM to about 0.1 M, about 80 mM to about 0.1 M, about 20 mM to about 80 mM, about 20 mM to about 50 M, about 30 mM to about 80 mM, or about 40 mM to about 60 mM.

In various embodiments, molar ratio of oxalic acid to the metal ion from the metal oxide precursor in the aqueous reagent may be in the range of about 8:1 to about 2:1, such as about 6:1 to about 2:1, about 4:1 to about 2:1, about 8:1 to about 4:1, about 8:1 to about 6:1, about 7:1 to about 3:1, or about 7:1 to about 5:1.

In specific embodiments where the metal oxide nanostructured material is niobium oxide, molar ratio of oxalic acid to the metal ion from the metal oxide precursor in the aqueous reagent is about 4:1, which was found by the inventors to be an optimized ratio.

The method comprises adding a buffering agent to the aqueous reagent to form a mixture. As used herein, the term "buffering agent" refers to a substance that may be added to the aqueous reagent so as to gradually increase pH of the mixture. In various embodiments, the buffering agent is selected from the group consisting of hexamethylenetetramine, urea, and combinations thereof. In specific embodiments, the buffering agent comprises or consists of hexamethylenetetramine.

Concentration of buffering agent in the mixture may vary depending, for example, on the metal oxide nanostructured material, and the buffering agent used.

In embodiments where the metal oxide nanostructured material is niobium oxide and the buffering agent is hexamethylenetetramine, concentration of hexamethylenetetramine in the aqueous reagent may be in the range of about 0.05 M to about 0.15 M. For example, concentration of hexamethylenetetramine in the aqueous reagent may be in the range of about 0.08 M to about 0.15 M, about 0.05 M to about 0.12 M, or about 0.08 M to about 0.12 M. In specific embodiments, concentration of hexamethylenetetramine in the aqueous reagent is about 0.1 M.

The method according to the first aspect includes heating the mixture under hydrothermal conditions to obtain the metal oxide nanostructured material.

The term "hydrothermal" as used herein refers to treatment conditions of a reagent in a sealed system such as a closed vessel or an autoclave, whereby temperatures in the system are raised to a temperature above normal boiling point of the reagent at a pressure that is equal to or greater than the pressure required to prevent boiling of the reagent.

In various embodiments, heating the mixture under hydrothermal conditions comprises heating the mixture, preferably in an autoclave, at a temperature in the range of about 180° C. to about 200° C. For example, heating the mixture may be carried out in the range of about 185° C. to about 200° C., about 190° C. to about 200° C., about 195° C. to about 200° C., about 180° C. to about 195° C., about 180° C. to about 190° C., about 185° C. to about 195° C., about 180° C., about 190° C., or about 200° C.

In various embodiments, heating the mixture under hydrothermal conditions comprises heating the mixture, preferably in an autoclave, for a time period in the range of about 12 hours to about 24 hours. For example, heating the mixture may be carried out for a time period in the range of about 18 hour to about 24 hours, about 20 hours to about 24 hours, about 12 hours to about 20 hours, about 12 hours to about 18 hours, about 12 hour to about 16 hours, about 16 hour to about 20 hours, or about 18 hour to about 20 hours.

The method may further comprise drying the metal oxide nanostructured material. In various embodiments, drying the metal oxide nanostructured material is carried out at a temperature in the range of about 40° C. to about 100° C. For example, the metal oxide nanostructured material may be dried by placing it in an oven that is set to a temperature that is in the range of about 50° C. to about 90° C. or about 50° C. to about 70° C., such as about 55° C. to about 85° C., about 60° C. to about 80° C., about 50° C. to about 75° C., about 50° C. to about 60° C., about 55° C. to about 65° C., or about 60° C. to about 65° C. The metal oxide nanostructured material may have a temperature that is the same or different from that of the oven temperature.

Drying the metal oxide nanostructured material may be carried out for any suitable time that is sufficient to dry the metal oxide nanostructured material. In various embodiments, drying the metal oxide nanostructured material is carried out for a time period of at least 6 hours, such as 8 hours, 9 hours, 10 hours, 12 hours, or 24 hours.

In various embodiments, the method disclosed herein further comprises annealing the metal oxide nanostructured material after drying. The term "annealing" as used herein refers to heating or subjecting a material to elevated temperatures for a period of time. Annealing the metal oxide nanostructured material may, for example, be carried out in air.

In some embodiments, annealing the metal oxide nanostructured material is carried out at a temperature in the range of about 550° C. to about 650° C., such as about 570° C. to about 650° C., about 600° C. to about 650° C., about 620° C. to about 650° C., about 550° C. to about 620° C., about 550° C. to about 600° C., about 550° C. to about 580° C., about 580° C. to about 620° C., or about 580° C. to about 600° C.

Annealing the metal oxide nanostructured material may be carried out for a time period of at least 3 hours, such as 4 hours, 5 hours, 8 hours, 12 hours, or 24 hours.

The metal oxide nanostructured material may be modified to obtain a modified metal oxide nanostructured material of enhanced properties. For example, the metal oxide nanostructured material may be doped with a metal different from the metal of the metal oxide nanostructured material. Accordingly, method according to various embodiments further comprises adding a substance comprising a dopant metal to the aqueous reagent to dope the metal oxide nanostructured material with the dopant metal.

The substance comprising the dopant metal may be selected from the group consisting of metal butoxide, metal isopropoxide, metal chloride, metal nitrate, metal sulfate, and combinations thereof. In specific embodiments, the substance comprising the dopant metal is a metal butoxide. In various embodiments, the dopant metal is selected from the group consisting of titanium, vanadium, nickel, cobalt, alloys thereof, and combinations thereof. In some embodiments, the dopant metal is titanium.

Advantageously, a dopant metal may be incorporated into the metal oxide nanostructured material in order to enhance performance of the metal oxide nanostructured material. For example, titanium atoms may be incorporated into orthorhombic $Nb_2O_5$ to form Ti doped orthorhombic $Nb_2O_5$, so as to enhance capacity and cycling stability of pristine orthorhombic $Nb_2O_5$, while maintaining pseudocapacitive $Li^+$ ion storage behavior when used in electrochemical cell. Due to the smaller cation diameter of Ti, reduction in lattice parameters of orthorhombic $Nb_2O_5$ lattice may take place as a result of the doping. The dopant metal may, for example, be incorporated into the metal oxide nanostructured material during annealing of the metal oxide nanostructured material, such that the dopant metal atoms may diffuse into the metal oxide nanostructured material, thereby doping it.

Ratio of the dopant metal and the metal of the metal oxide precursor in the aqueous reagent may be about 1:5 or less. For example, ratio of the dopant metal and the metal of the metal oxide precursor in the aqueous reagent may be in the range of about 1:10 to about 1:5, or about 1:15 to about 1:7. In specific embodiments, ratio of the dopant metal and the metal of the metal oxide precursor in the aqueous reagent is about 1:5.

In doping the metal oxide nanostructured material with a dopant metal, morphology of the metal oxide nanostructured material may be changed. For example, when orthorhombic niobium oxide is doped with titanium, the orthorhombic niobium oxide may transform from a nanorod structure to take on a nanoflake structure. In such embodiments, thickness of the nanoflake may be in the range of tens of nanometers, such as about 20 nm, while lateral dimension of the nanoflake may be in the range of hundreds of nanometers, such as about 200 nm.

In addition to, or apart from the above, the method may further comprise forming a layer of carbon on the metal oxide nanostructured material. Advantageously, by forming a layer of carbon on the metal oxide nanostructured material, stability of the metal oxide nanostructured material may be further improved. Furthermore, electrochemical performance of the metal oxide nanostructured material may be enhanced.

For example, forming a layer of carbon on the metal oxide nanostructured material may be carried out by carbonization of organic small molecule and/or a polymer. Examples of substances that may be used to form the layer of carbon include, but are not limited to, sugar, starch, polyaniline, and polydopamine. Generally, thickness of the layer of carbon may be about 20 nm or less.

Various embodiments refer in further aspects to a metal oxide nanostructured material prepared by a method according to the first aspect, and an electrode comprising a metal oxide nanostructured material prepared by a method according to the first aspect.

Generally, the electrode comprising the metal oxide nanostructured material disclosed herein forms the anode of an electrochemical cell. In this regard, various embodiments refer in a further aspect to an electrochemical cell.

The term "electrochemical cell" or "cell" as used herein refers generally to a device that converts chemical energy into electrical energy, or electrical energy into chemical energy. Generally, electrochemical cells have two or more electrodes and an electrolyte, wherein electrode reactions occurring at the electrode surfaces result in charge transfer processes. Examples of electrochemical cells include, but are not limited to, batteries and electrolysis systems.

The electrochemical cell comprises an anode and a cathode. The terms "anode" and "negative electrode" are used interchangeably, and refer to the electrode having the lower of electrode potential in an electrochemical cell (i.e. lower than the positive electrode). Conversely, the terms "cathode" and "positive electrode" are used interchangeably, and refer to the electrode having the higher of electrode potential in an electrochemical cell (i.e. higher than the negative electrode). The term "electrode potential" refers to a voltage, usually measured against a reference electrode, due to the presence within or in contact with the electrode of chemical species at different oxidation (valence) states.

The anode of the electrochemical cell disclosed herein comprises a metal oxide nanostructured material prepared by a method according to the first aspect. The cathode, on the other hand, comprises a composite of an electrically conducting polymer and a carbon-based material.

Advantageously, combination of a pseudocapacitive negative electrode and positive electrode such as that disclosed herein may greatly enhance energy density of the supercapacitor device. When the higher energy density electrode materials undergo electrochemical reaction, for example, they may provide greatly enhanced energy density in the resulting device. The higher energy density electrode materials are highly desirable in industrial application. As such, energy density of an electrochemical cell in the form of a supercapacitor device as disclosed herein may be comparable with lithium ion battery, while providing a much higher power density.

The electrically conducting polymer comprised in the cathode may be a redox active conjugated conducting polymer. In various embodiments, the electrically conducting polymer is selected from the group consisting of a polyaniline-based polymer, a polypyrrole-based polymer, a thiophene-based polymer, copolymers thereof, and combinations thereof. In some embodiments, the electrically conducting polymer comprises or consists of a polyaniline-based polymer. In specific embodiments, the electrically conducting polymer comprises or consists of polyaniline. Advantageously, polyaniline has a theoretical capacity of 964 C $g^{-1}$, which outscores most of the lithium ion battery positive electrode material, such as $LiCoO_2$, and/or $LiFePO_4$.

A carbon-based material is also comprised in the cathode. The carbon-based material may be selected from the group consisting of activated carbon, templated carbon, carbon nanotubes, carbon aerogels, graphene, and combinations thereof.

In various embodiments, the carbon-based material comprises one or more single-walled carbon nanotubes. The electrically conducting polymer may form a uniform layer around each of the single-walled carbon nanotubes. Diameter of the electrically conducting polymer coated single-walled carbon nanotube may be in the range of about 40 nm to about 60 nm. In specific embodiments, diameter of the electrically conducting polymer coated single-walled carbon nanotube is about 50 nm. Advantageously, this provides great benefit for shortening ion diffusion length.

The anode and the cathode may independently further comprise a binder. As used herein, the term "binder" refers to a substance that is capable of holding or attaching two or more materials together. Either one of or both the anode and the cathode may contain the binder. The binder that is comprised in the anode and the cathode may be the same or different. In various embodiments, the same binder is used in the anode and the cathode. Examples of a binder that may be used include, but are not limited to, polyvinylidene fluoride (PVDF), styrene-butadiene rubber (SBR), polyacrylic acid (PAA), carboxymethyl cellulose (CMC), polyacrylonitrile, polymethylmethacrylate (PMMA), polytetrafluoroethylene (PTFE), mixtures thereof, and copolymers thereof.

In various embodiments, the binder comprises or consists of polyvinylidene fluoride (PVDF). Advantageously, PVDF provides good binding properties as well as good electrochemical stability.

The anode and the cathode may independently further comprise an electrically conductive agent. Generally, the electrically conductive agent may be used to maximize flow rate, increase extraction efficiency, and decrease electrode regeneration time of the electrochemical cell by facilitating the formation of thinner electrodes. Either one of or both the anode and the cathode may contain the electrically conductive agent. The electrically conductive agent that is comprised in the anode and the cathode may be the same or different. In various embodiments, the same electrically conductive agent is used in the anode and the cathode.

In various embodiments, the electrically conductive agent is selected from the group consisting of graphite, conductive carbon black, conductive carbon fibers, metal fibers, metal particles, particles of intrinsically conductive polymers, and combinations thereof. In specific embodiments, the electrically conductive agent comprises or consists of conductive carbon black.

The metal oxide nanostructured material, binder and/or the electrically conductive agent may be dispersed in a solvent to form a slurry. Examples of solvent may be used include 1-methyl-2-pyrrolidinone (NMP), acetone, water, and the like. In various embodiments, the solvent comprises or consists of 1-methyl-2-pyrrolidinone. In various embodiments, the weight ratio of metal oxide nanostructured material to electrically conductive agent to binder in the slurry is about 80:10:10.

The electrochemical cell may further comprise an electrolyte. The electrolyte serves to provide a conducting medium between the anode and cathode. The electrolyte may be a lithium salt based organic electrolyte, and may contain a lithium salt such as lithium perchlorate dissolved in a suitable solvent such as propylene carbonate.

Examples of applications in which the electrochemical cell may be used include, but are not limited to, load-leveling markets, for example output smoothing in wind mill, solar panel; energy storage in micro grid; power regeneration and power assistance in transportation, for example, provide acceleration and harvest deceleration energy from vehicles; backup power in factories, data centers, medical centers; and power source in electrical vehicles, personal electronics products.

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

As used herein, the term "and/or" includes any and all combinations of one or more of the associated listed items. The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

Experimental Section

A electrochemical energy storage device, such as a supercapacitor device, with a new combination of active materials in negative electrode and positive electrode and using organic electrolyte according to various embodiments is disclosed herein. In some embodiments, the electrode active material is a redox active electrode material, which may be used to replace current prevailing carbon material in supercapacitor devices.

FIG. 1 is a schematic diagram showing operation mechanism scheme of (a) conventional EDLC supercapacitor device in market (prior art); and (b) a supercapacitor cell comprising new electrode materials disclosed herein according to embodiments.

In a conventional EDLC supercapacitor device as shown in FIG. 1(a), both electrodes may be formed of a high surface area carbon material. Energy storage may be realized through reversible adsorption/desorption of electrolyte ions on the carbon surface, forming so-called electric double layer under electrode polarization. Capacitance may be formed between the electric double layers. Such technology may have a few short-comings. Firstly, improvement in capacitance of the device may be limited as it may be difficult to further improve on the over 3000 $m^2\ g^{-1}$ surface area of carbon achieved currently. Another drawback may be the relatively high self-discharge current. High electric field between the electric double layers may discharge overtime, thereby causing unnecessary energy drainage. Thirdly, cell voltage of the carbon-carbon device may be limited to less than 2.7 V. Serious electrolyte degradation, mainly from organic solvents may occur beyond 2.7 V. This may further restrict improvement of the cell energy density. Although some companies provide hybrid cell solutions, carbon electrode may still be used in one electrode. Thus, above shortcomings of carbon electrode may still exist. More importantly, there is lack of a suitable material that may replace carbon in the supercapacitor.

In the proposed supercapacitor device according to various embodiments such as that shown in FIG. 1(b), both conventional carbon electrodes may be replaced by redox active materials. The redox active materials may undergo multi-electrons reduction/oxidation during charge/discharge process in a lithium salt based organic electrolyte. Much higher energy may be stored by these materials as compared to carbon. More specifically, niobium oxide ($Nb_2O_5$) may be used in the negative electrode, and polyaniline (PANI) in the positive electrode. Advantageously, price of niobium metal (USD 30/kg) is lower than that of cobalt (USD 32/kg), therefore, cost of the proposed supercapacitor does not exceed current lithium ion battery technology using $LiCoO_2$.

The proposed device operation mechanism may be explained as follows. During cell charging, $Li^+$ may be inserted into $Nb_2O_5$ comprised in the negative electrode, while anion from the electrolyte may be doped into PANI comprised in the positive electrode. This may result in an increase in the cell voltage. During cell discharging, there is the reverse process of charging. Several advantages of the proposed device as compared to market technology may exist. Firstly, the electrode materials may use Faradic reaction in the bulk material to store the energy, which may result in a significantly higher capacitance as compared to carbon materials. Specifically, the $Nb_2O_5$ and PANI developed may have a capacity of 720 C $g^{-1}$ and 650 C $g^{-1}$, respectively. These values may be much higher than the best carbon material in market of about 200 C $g^{-1}$. Secondly, the charged states of redox materials may be distinctly more stable than charged carbon materials, which may result in a much smaller discharge current. Thirdly, based on the inventors' findings, rate capabilities of the proposed materials may be comparable to carbon materials, which means that the proposed device may preserve the high power density characteristic of supercapacitors. Furthermore, the proposed device may avoid catalytic electrolyte dissociation at high voltage, as it is able to charge beyond 2.7 V. Combining with the high capacity of electrode materials, the proposed device may obtain a much higher energy density than current supercapacitor technology.

Not only are the new electrode materials compatible with current manufacturing technology, they also possess much higher capacitance than carbon. The new materials based supercapacitor is expected to achieve an energy density close to 100 Wh $kg^{-1}$ without sacrificing power density, thereby demonstrating comparable performance to that of lithium ion batteries. This may result in significant changes in the market structure as applications which use lithium ion batteries may be replaced by supercapacitors. For example, power source in electric vehicle may use supercapacitors to reduce charging time. The improved energy density of supercapacitors according to embodiments disclosed herein also translates into a lower number of supercapacitor modules required for grid energy storage.

As demonstrated herein, the supercapacitor device according to various embodiments has high energy density. It is different from the three existing electrochemical energy storage devices of electrical double layer capacitors, asymmetric supercapacitors, and lithium ion capacitors, and contains the following components: negative electrode, separator, positive electrode, organic electrolyte, lithium salts and sealing case.

The electrode includes a stainless plate current collector, active material, carbon black, and polymer binder (PVDF). In some embodiments, Ti doped orthorhombic $Nb_2O_5$ (Ti doped $T-Nb_2O_5$) forms the negative electrode active material, while polyaniline-single wall carbon nanotube (PANI-SWCNT) composite material forms the positive active electrode. The supercapacitor device may work from 0 V to 3 V with high energy density of 110.3 Wh $kg^{-1}$@150 W $kg^{-1}$, while the experimental power density can reach 3 kW $kg^{-1}$.

In various embodiments, the Ti doped $T-Nb_2O_5$ was prepared using the following procedure: a) a certain amount of $NbCl_5$ was dispersed in the mixed solvent of 15 ml DI water and 5 ml ethylene glycol followed by addition of oxalic acid to give a clear solution. The concentration of $Nb^{5+}$ may range from 20 mM to 0.1 M, while the molar ratio between oxalic acid and $Nb^{5+}$ should be fixed at 4:1. b) The titanium (IV) butoxide was added in to above solution until it is fully dissolved. The ratio between Ti and Nb could range between 0 to 1:5. c) Hexamethylenetetramine (HMTA) was dissolved in above solution to get a 0.1 M concentration. d) The reaction was carried out at known fixed temperature in autoclave. After a further 12 to 24 hours of reaction, the yellow product was collected by centrifugation. The reaction temperature may range from 180° C. to 200° C. e) After the reaction, the product was washed several times with ethanol and distilled water followed by drying at 60° C. for 6 hours. Generally, the temperature should be about 50° C. to 70° C. with a timing over 6 hours. f) The dried sample was further heat treated at 600° C. in air for 3 hrs to give the final product Ti doped $T-Nb_2O_5$.

In some embodiments, carbon coated orthorhombic phase $Nb_2O_5$ ($C-T-Nb_2O_5$) forms the negative electrode, while polyaniline-carbon composite material forms the positive active electrode. To form the carbon coated orthorhombic phase $Nb_2O_5$ ($C-T-Nb_2O_5$), orthorhombic $Nb_2O_5$ ($T-Nb_2O_5$) was prepared using the same procedure as that mentioned above for Ti doped $T-Nb_2O_5$, except that titanium (IV) butoxide was not added. A thin layer of carbon was then coated on the orthorhombic $Nb_2O_5$ to form the carbon coated orthorhombic phase $Nb_2O_5$.

Apart from the above-mentioned, where a composite of PANT and carbon is used, active material of the positive electrode may alternatively be polypyrrole and related redox active conjugated conducting polymers and their composite materials with carbon. The carbon material may include, but is not limited to, activated carbon, CNT, and/or graphene.

Example 1: Synthesis and $T-Nb_2O_5$ Materials

A certain amount of $NbCl_5$ was dispersed in the mixed solvent of 15 ml DI water and 5 ml ethylene glycol followed by addition of oxalic acid to give a clear solution. The concentration of $Nb^{5+}$ may range from 20 mM to 0.1 M, while molar ratio between oxalic acid and $Nb^{5+}$ was fixed at 4:1. In some of the experiments, concentration of $Nb^{5+}$ was 40 mM. The titanium (IV) butoxide was added into the above solution until it is fully dissolved. The ratio between Ti and Nb may range between 0 to 1:5. In some of the experiments, ratio between Ti and Nb was 1:5. Hexamethylenetetramine (HMTA) was dissolved in above solution to get a 0.1 M concentration.

The reaction was carried out at 180° C. in an autoclave. The temperature may range from 180° C. to 200° C. After a further 14 hours of reaction, the product was collected by centrifugation. The time for reaction may be in the range of 12 to 24 hours. The product was washed several times with ethanol and distilled water followed by drying at 60° C. for 6 hours. The dried sample was further heat treated at 600° C. in air for 3 hrs to give the final product Ti doped $T-Nb_2O_5$. The $T-Nb_2O_5$ was synthesized without the addition of titanium (IV) butoxide. The samples were labeled as Ti doped $T-Nb_2O_5$ and $T-Nb_2O_5$, respectively.

Example 2: Synthesis of PANI-SWCNT Composite Material

SWCNT was first dispersed in the 1 wt % sodium doceylsulfate in 0.5 M $H_2SO_4$ solution with sonication to give a 0.1 mg $ml^{-1}$ concentration. The SWCNT suspension was then immersed into ice bath and aniline monomer was added into the suspension to give a 13.7 mM concentration. A pre-cooled 4° C. ammonium persulfate solution was added dropwise into the above suspension with magnetic stirring and the reaction was further stirred for 12 hours. The sample was separated by centrifuge and washed with ethanol and DI water several times. The sample was then dried by freeze drying.

Example 3: Structural Characterization of Ti Doped $T-Nb_2O_5$ and $T-Nb_2O_5$ Materials The products were characterized using X-ray powder diffractometry (XRD; Shimadzu XRD-6000, Cu Ka radiation) at a scan rate of 2° $min^{-1}$, scanning electron microscopy (FESEM; JEOL, JSM-7600F) and transmission electron microscopy (TEM; JEOL, JEM-2010).

Figure 2:
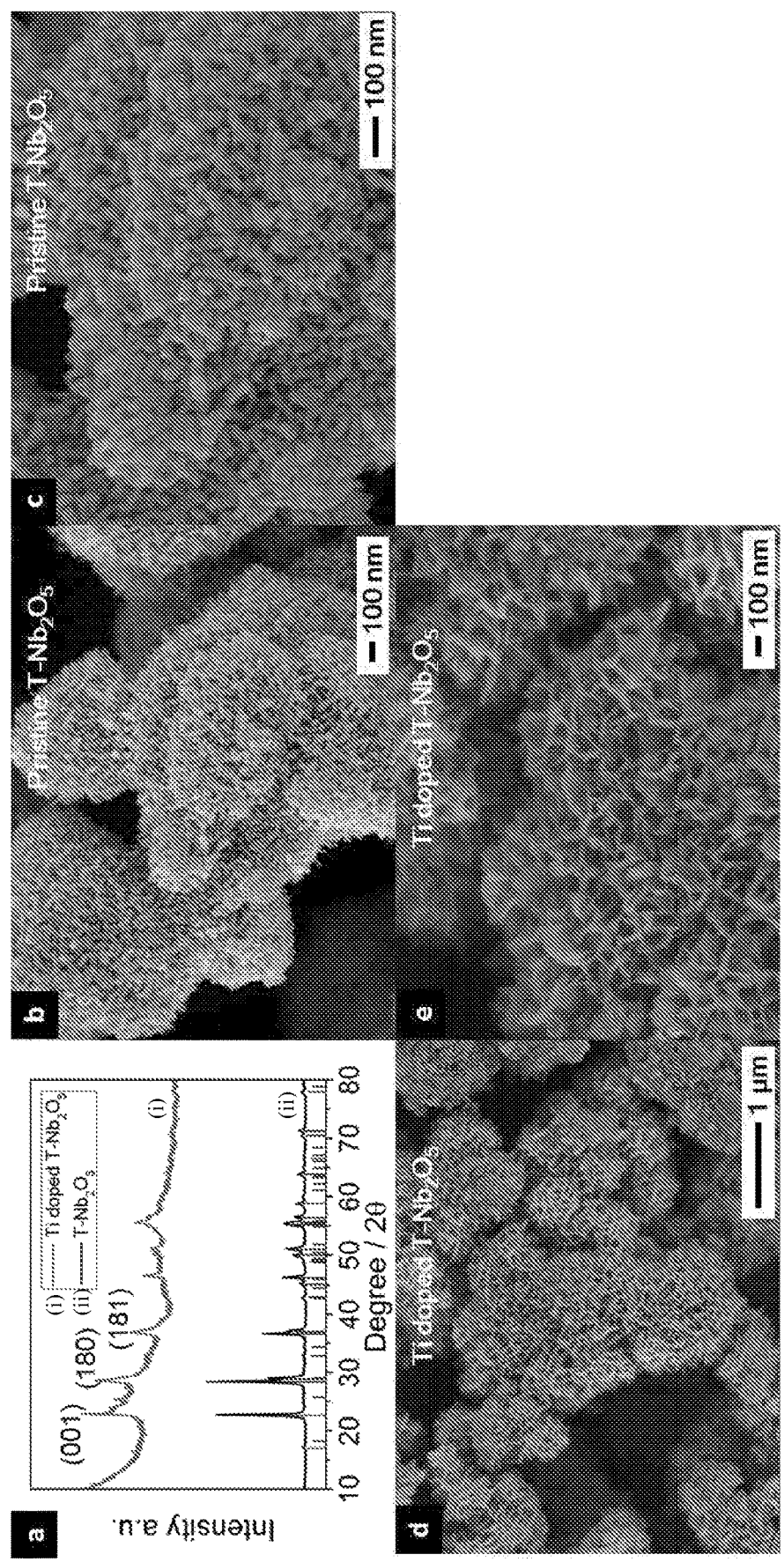
FIG. 2 shows (A) X-ray powder diffraction (XRD) of (i) sample titanium doped orthorhombic niobium oxide (Ti doped T-$Nb_2O_5$) and (ii) sample orthorhombic niobium oxide (T-$Nb_2O_5$); (B) and (C) scanning electron microscopy (SEM) images of sample T-$Nb_2O_5$ ("Pristine T-$Nb_2O_5$") at different magnifications; (D) and (E) SEM images of sample Ti doped T-$Nb_2O_5$ ("Ti doped T-$Nb_2O_5$") at different magnifications. Scale bar in the figures represents: (B), (C) and (E): 100 nm; (D): 1 μm.

The X-ray powder diffraction was used to characterize the phase and crystal structure of the pristine $T-Nb_2O_5$ sample and Ti doped $T-Nb_2O_5$ sample. As shown in FIG. 2(A), the diffraction peaks of $T-Nb_2O_5$ sample matched well with PDF #030-0873, while the main diffraction peaks from Ti doped $T-Nb_2O_5$ also agreed with the $T-Nb_2O_5$ sample. Meanwhile, there was shift of diffraction (001) (180) (181) peak positions in Ti doped $T-Nb_2O_5$ sample to a higher degrees (about 0.26°, 0.1396°, and 0.26°, respectively). It indicated successful doping of foreign cation and reduction in lattice parameters due to the smaller cation diameter of $Ti^{4+}$.

FIG. 2(B) shows the scanning electron microscopy (SEM) images of $T-Nb_2O_5$ sample, where the sample consisted of a few micrometers sized particles. These particles were assembled by nanorods with non-conformal size distribution, as shown in FIG. 2(C). The nanorods, however, were seriously agglomerated. Additionally, distinct differences in morphology may be observed when Ti element was incorporated into $T-Nb_2O_5$. The morphologies of Ti doped $T-Nb_2O_5$ sample changed from nanorod assemblies into nanoflake assemblies, as shown in FIG. 2(D). On closer observation in FIG. 2(E), the nanoflakes showed abundant voids between adjacent structures with no agglomerations. Meanwhile, the nanoflake shows small thickness, which is less than a few tens of nanometers. In some cases, thickness of nanoflake was less than 20 nm.

Figure 3:
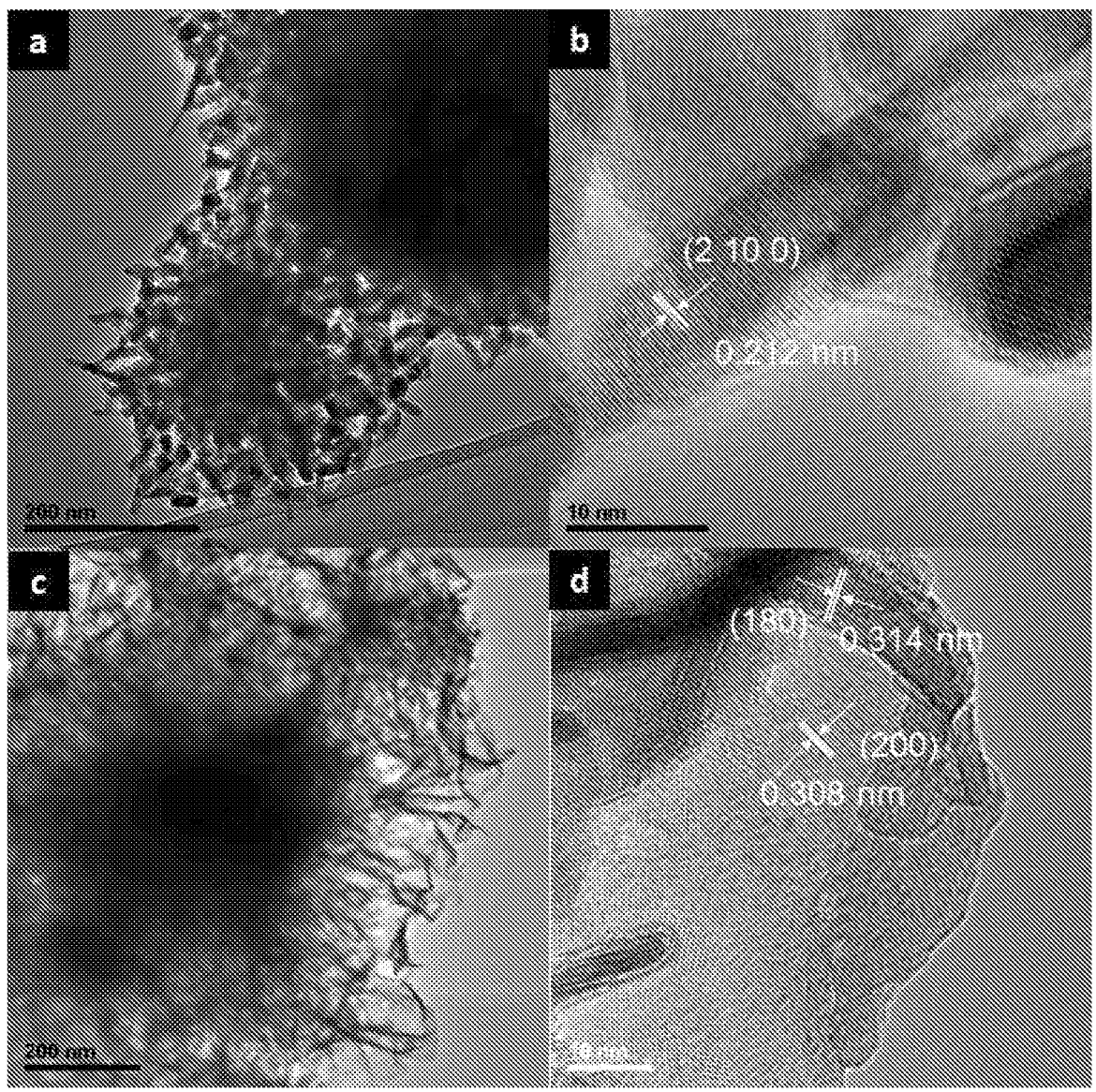
FIG. 3 shows (A) and (B) transmission electron microscope (TEM) images of sample T-$Nb_2O_5$ at low magnification and high magnification; (C) and (D) TEM images of sample Ti doped T-$Nb_2O_5$ at low magnification and high magnification. Scale bar in the figures represents: (A) and (C): 200 nm; (B) and (D): 10 nm.

More detailed structural study was carried out using Transmission Electron Microscope (TEM). As shown in FIG. 3(A), it may be clearly seen that $T-Nb_2O_5$ sample was assembled by short nanorods with irregular lengths and diameters. The length of nanorods was generally less than 100 nm. While the resolution TEM image in FIG. 3(B) showed the clear lattice fringes of the nanorod, showing its single crystalline nature. The crystal lattice spacing in FIG. 3(B) was measured to be 0.212 nm, corresponding to spacing between the (2,10,0) plane in $Ti-Nb_2O_5$. The TEM images of Ti doped $T-Nb_2O_5$ sample were shown in FIGS. 3(C) and (D). In FIG. 3(C), it may be observed that Ti doped T-Nb$_2$O$_5$ sample showed distinct difference in the micro structure as compared with the pristine T-Nb$_2$O$_5$ sample. The Ti doped T-Nb$_2$O$_5$ sample was assembled by dozens of nanoflakes over 200 nm in lateral dimension. Detailed observation of nanoflake under high resolution TEM was shown in FIG. 3(D). It may be observed that there are multiple crystal domains co-existing in the one nanoflake. Some representative areas show lattice fringes with different orientations, suggesting the polycrystalline nature of the Ti doped T-Nb$_2$O$_5$ sample. The lattice spacings were measured to be 0.314 nm and 0.308 nm, corresponding to the lattice spacing of (180) plane and (200) plane respectively.

Example 4: Electrochemical Characterization of Ti Doped T-Nb$_2$O$_5$ and T-Nb$_2$O$_5$ Materials Activated carbon was purchased from XinSen Carbon Industry Co., Ltd, with a BET surface area of 2084.15 m$^2$ g$^{-1}$. The working electrode was prepared according to the following: the active material, carbon black and polyvinylidene fluoride (PVDF) were mixed in NMP at a weight ratio of 80:10:10. The resulting slurry was coated onto stainless steel substrate and dried in 80° C. overnight.

The electrochemical properties of sample T-Nb$_2$O$_5$ and sample Ti doped T-Nb$_2$O$_5$ were tested in CR2032 Coin cell assembled in an Ar filled glovebox with Li disk as both reference and counter electrode, and 1 M LiPF$_6$ dissolved in 1:1 v/v mixture of ethylene carbonate/diethyl carbonate (EC/DEC) was employed as the electrolyte.

Figure 4:
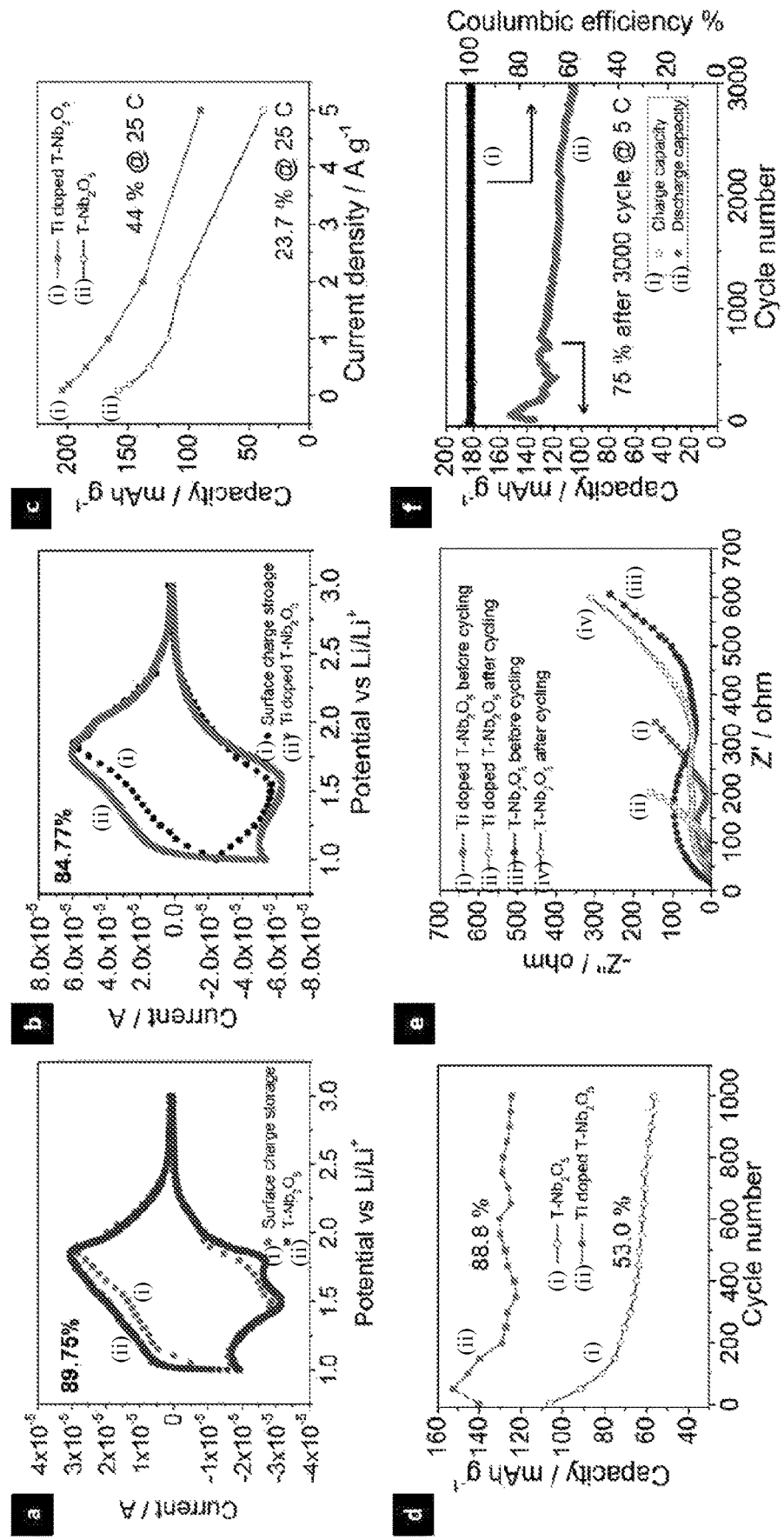
FIG. 4 shows (A) current-voltage (CV) curve of sample T-$Nb_2O_5$ at 0.1 mV s$^{-1}$ and the round dots show the surface charge storage; (B) CV curve of sample Ti doped T-$Nb_2O_5$ at 0.1 mV s$^{-1}$ and the round dots show the surface charge storage; (C) relationship between capacity and current density of (i) sample Ti doped T-$Nb_2O_5$ and (ii) sample T-$Nb_2O_5$; (D) capacity retention of (i) sample T-$Nb_2O_5$ and (ii) sample Ti doped T-$Nb_2O_5$ during 1000 cycles at a current density of 1 A g$^{-1}$ (5 C); (E) Nyquist plots of sample T-$Nb_2O_5$ and sample Ti doped T-$Nb_2O_5$ before and after cycling tests; (F) capacity retention of Ti doped T-$Nb_2O_5$ during 3000 cycles at a current density of 1 A g$^{-1}$ (5 C).

Cyclic voltammetry was used to investigate the electrochemical behavior of different samples. Typical CV curves at 0.1 mV s$^{-1}$ of sample T-Nb$_2$O$_5$ and sample Ti doped T-Nb$_2$O$_5$ were shown in FIGS. 4(A) and (B). In FIG. 4(A), the anodic peaks at 1.50 V and 1.81 V may be attributed to the reduction of Nb$^{5+}$ to Nb$^{4+}$ and Nb$^{4+}$ to Nb$^{3+}$ (Li$^+$ intercalation) subsequently, while the board cathodic peaks centered at 1.75 V were the result of Li$^+$ deintercalation from Nb$_2$O$_5$, as shown in Equation 1.

$$x\text{Li}^+ + xe^- + \text{Nb}_2\text{O}_5 \leftrightarrow \text{Li}_x\text{Nb}_2\text{O}_5 \qquad (1)$$

In FIG. 4(B), the CV curve of sample Ti doped T-Nb$_2$O$_5$ showed a different scenario. There was only one board anodic peak at 1.57 V, while the cathodic peak was centered at 1.77 V. In addition, a small hump at 2.0 V was also observed. The small hump at 2.0 V and merge of anodic peak may be attributed to the additional redox reaction between Ti$^{4+}$ and Ti$^{3+}$.

The behaviors of charge storage of the two samples were further tested using scan rate dependent analysis at 0.1, 0.2, 0.3, 0.4 and 0.5 mV s$^{-1}$. The current obtained during cyclic voltammetry consists of two parts: non-diffusion controlled redox reaction current (surface charge storage and pseudo capacitive charge storage) and diffusion controlled redox reaction current. In fact, the surface redox reaction current has the linear relationship with the experiment scan rate, that is i=av. On the other hand, the diffusion controlled redox reaction current has the linear relationship with the square root of the experiment scan rate, that is i=b v$^{1/2}$. Overall, the experiment current recorded during tests can be expressed in Equation 2 as:

$$i = av + bv^{1/2} \qquad (2)$$

which can be transformed into Equation 3:

$$i/v^{1/2} = av^{1/2} + b \qquad (3)$$

By using scan rate dependent analysis, the coefficients of a and b may be determined. In this way, non-diffusion controlled charge storage and diffusion controlled charge storage may be distinguished at test scan rates.

The results of non-diffusion controlled current during CV test at 0.1 mV s$^{-1}$ were shown in the dot lines in FIGS. 4(A) and (B) respectively. The surface charge storage of sample T-Nb$_2$O$_5$ was 89.75% of the total charge storage, while the surface charge storage of sample Ti doped TNb$_2$O$_5$ was 84.77%. As have been demonstrated in previous studies, the orthorhombic phase Nb$_2$O$_5$ showed pseudocapacitive Li$^+$ insertion charge storage behavior.

This property was definitely beneficial for high rate capability energy storage. For Ti doped T-Nb$_2$O$_5$ disclosed herein, the surface charge storage ratio was similar with pristine T-Nb$_2$O$_5$. Thus, the Ti doped T-Nb$_2$O$_5$ sample was also estimated to possess high rate capability.

The relationships between capacity and current density of sample T-Nb$_2$O$_5$ and Ti doped T-Nb$_2$O$_5$ sample were shown in FIG. 4(C). The Ti doped T-Nb$_2$O$_5$ sample showed much enhanced Li$^+$ ion storage capacity of 204.3 mAh g$^{-1}$ comparing with the 157.9 mAh g$^{-1}$ of pure T-Nb$_2$O$_5$ sample at 0.1 A g$^{-1}$ (0.5 C). In addition, the rate capability of sample Ti doped T-Nb$_2$O$_5$ was superior than sample T-Nb$_2$O$_5$. When the current density increased to 5 A g$^{-1}$ (25 C), the capacity remained at 44% for sample T-Nb$_2$O$_5$ and 23.7% for sample T-Nb$_2$O$_5$. The long term cycling stability of both samples was further examined at 1 A g$^{-1}$ (5 C) for 1000 cycles. The testing current and cycle times were considered challenging for most Li$^+$ ion storage electrodes. The capacity of T-Nb$_2$O$_5$ sample experienced fast degradation during the first 200 cycles, which showed similar trends with other works. Eventually, the capacity remained only 53.0% after 1000 cycles. However, the capacity of Ti doped T-Nb$_2$O$_5$ sample remained 88.8% after 1000 cycles, which suggested much improved stability of T-Nb$_2$O$_5$ material by Ti doping.

To further investigate the electrochemical property differences of sample T-Nb$_2$O$_5$ and sample Ti doped T-Nb$_2$O$_5$, electrochemical impedance spectrum (EIS) is performed before and after cycling tests of both samples. As shown in FIG. 4(E), before cycling test, sample Ti doped T-Nb$_2$O$_5$ shows distinct smaller semi-cycle diameter comparing with the sample T-Nb$_2$O$_5$. It suggests the much smaller charge transfer resistance from the faradic reaction. The reduction in the charge transfer resistance of Ti doped T-Nb$_2$O$_5$ could be due to the lithium insertion into the Ti doped T-Nb$_2$O$_5$ resulting better electronic conductivity. The reduction in charge transfer resistance is beneficial for better rate capability of sample Ti doped T-Nb$_2$O$_5$. Moreover, after long term cycling, the charge transfer resistance of sample Ti doped T-Nb$_2$O$_5$ is greatly reduced. On the other hand, the charge transfer resistance of sample T-Nb$_2$O$_5$ is more or less the same after long term cycling test. The reduction in the charge transfer resistance in sample Ti doped T-Nb$_2$O$_5$ after cycling may be due to the activation process of the material. More prolonged cycling test for sample Ti doped T-Nb$_2$O$_5$ is performed for 3000 cycles. As shown in FIG. 4(F), the capacity of sample Ti doped T-Nb$_2$O$_5$ remains 75% after 3000 cycles, while the coulombic efficiency remains almost 100% during the cycling. Such cycling stability is greatly enhanced comparing with previous pristine Nb$_2$O$_5$ materials.

Example 5: Structural and Electrochemical Characterization of PANI-SWCNT Composite Material The SEM images of PANI-SWCNT composite material at different magnifications were shown in FIGS. 5(A) and (B).

As shown in the SEM images, the PANI was uniformly coated onto the SWCNT, while there is no obvious observation of PANI forming large agglomerates. It therefore suggests the conformal formation of PANI on the SWCNT surface. Meanwhile, the diameter of the PANI coated SWCNT was around 50 nm, which was of great benefit for shortening the ion diffusion length.

The electrochemical properties of PANI-SWCNT composite material were tested in three electrode cell in ambient environment with Ag/AgCl as the reference electrode and a piece of Pt as the counter electrode. 1 M LiClO$_4$ dissolved in propylene carbonate was employed as the electrolyte.

The working electrode was prepared according to the following: the active material, carbon black and PVDF were mixed in NMP at a weight ratio of 80:10:10. The resulting slurry was coated onto graphite paper substrate and dried in 80° C. overnight.

Figure 5:
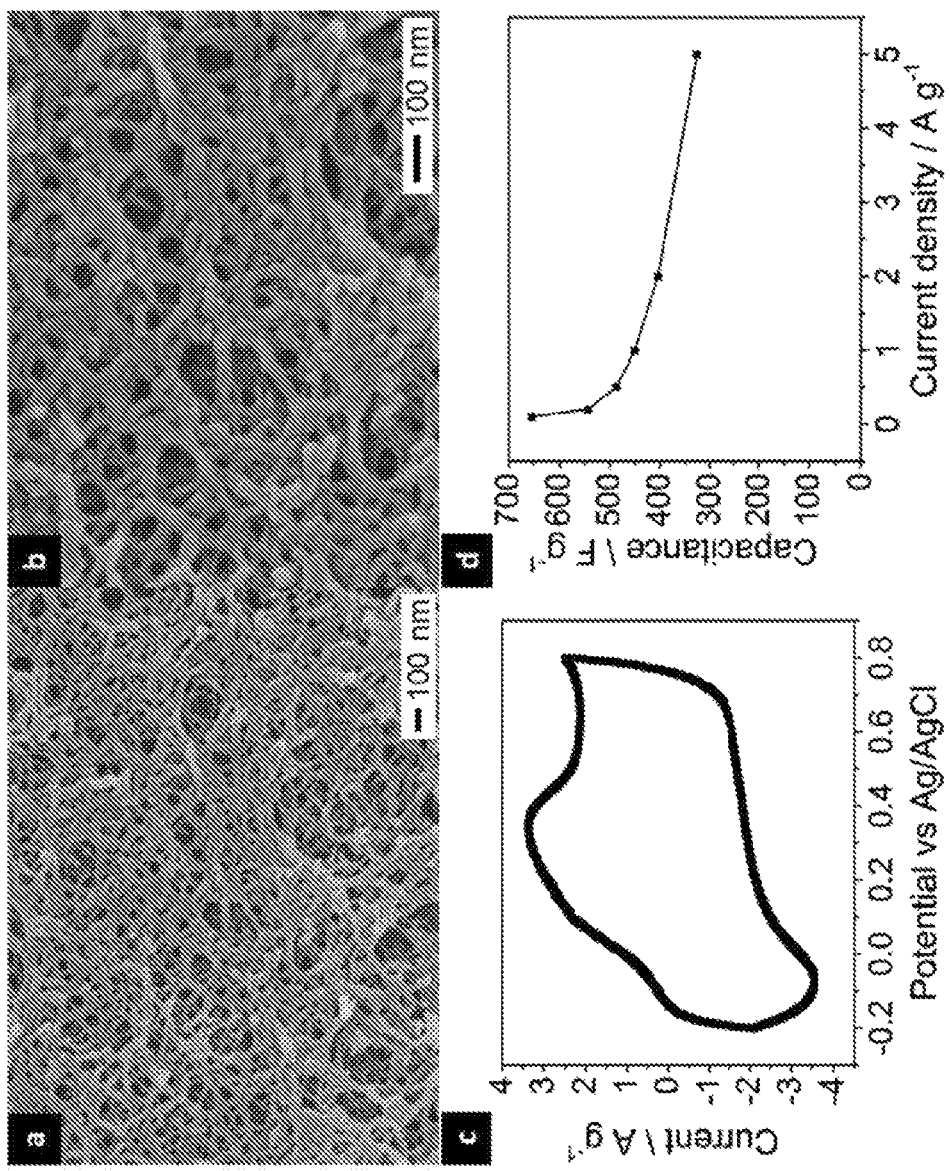
FIG. 5 shows (A) and (B) SEM images of polyaniline-single walled carbon nanotubes (PANI-SWCNT) sample at different magnifications; (C) CV curves of sample PANI-SWCNT at 0.2 mV s$^{-1}$; (D) relationship between capacitance and current density of sample PANT-SWCNT. Scale bar in (A) and (B) represents 100 nm.
Figure 7:
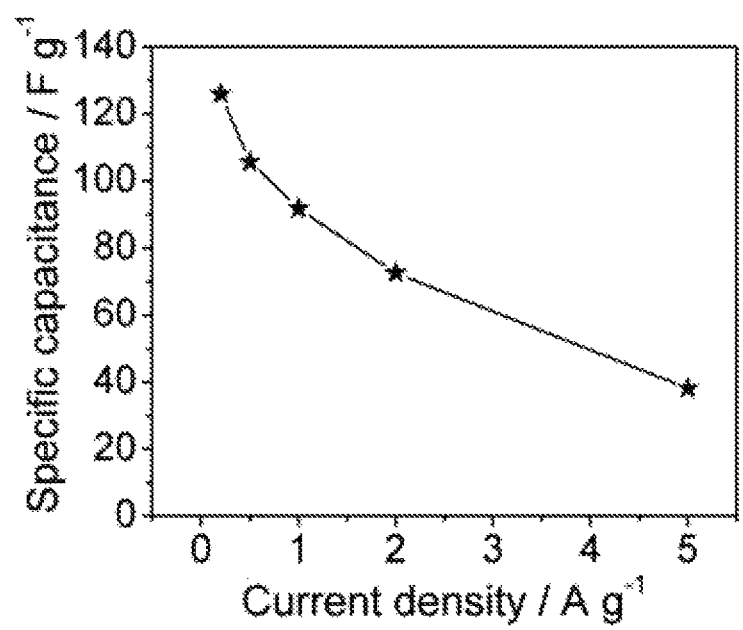
FIG. 7 is a graph showing relationship between different current densities and specific capacitances of activated carbon measured from 0 to 1 V vs Ag/AgCl in 1M LiClO$_4$ in PC.

The cyclic voltammetry was first carried out to examine the electrochemical behavior of the PANI-SWCNT composite material from −0.2 V to 0.8 V vs Ag/AgCl (3 V to 4 V vs Li/Li). As shown in FIG. 5(C), there was a pair of redox peaks between −0.1 V to 0.4 V, which included the conversion between the fully reduced leucoemeraldine base to the partially oxidized emeraldine and between emeraldine and pernigraniline. Galvanostatic charge-discharge tests were performed to determine the capacitance of PANI-SWCNT composite material. The corresponding charge-discharge curves are shown in FIG. 5(D). The well symmetric triangular shape charge-discharge curves indicate the well-defined capacitive behavior of PANI-SWCNT composite material. The capacitance of composite material was calculated according to the Equation 4:

$$C_{sp} = I\Delta t / M \Delta V \quad (4)$$

where I is the discharge current, $\Delta t$ is the discharge time after IR drop, M is the mass of active material, and $\Delta V$ is the test potential window. The specific capacitance of PANI-SWCNT composite material is 650 F g$^{-1}$ @ 0.1 A g$^{-1}$, while it maintains 300 F g$^{-1}$ @ 5.0 A g$^{-1}$, showing good rate capability in organic electrolyte. This value is significantly higher than the capacitance of activated carbon as shown in FIG. 7.

Example 6: Assembly of Supercapacitor Full Cell and Electrochemical Property

Supercapacitor full cells/supercapacitor devices were assembled in an Ar filled glovebox using Ti doped T-Nb$_2$O$_5$ as anode and activated carbon or PANI-SWCNT composite material (or activated carbon) as cathode based on the charge balancing principle in Equation 5:

$$Q_{Ti-Nb2O5} = Q_{PANI-SWCNT} \quad (5)$$

where $Q_{Ti-Nb2O5} = m_1 \times 204.3$ mAh g$^{-1}$ = $m_1 \times 735.48$ C g$^{-1}$, while $Q_{PANI-SWCNT} = m_2 \times 653.65$ F g$^{-1} \times 1$ V = $m_2 \times 653.65$ C g$^{-1}$. Thus, $m_1:m_2 = 1:1.12$. The mass ratio between Ti doped T-Nb$_2$O$_5$ and activated carbon may be calculated likewise.

The device was assembled based on the optimum mass ratio in CR2032 coin cell in Ar filled glovebox using 1 M LiClO$_4$ dissolved in propylene carbonate as electrolyte. A piece of celigard battery separator was applied as the separator. The cyclic voltammetry and galvnostatic charge-discharge tests of hybrid device were conducted using Autolab PGSTAT 30 potentiostat from 0 V to 3 V.

Figure 6:
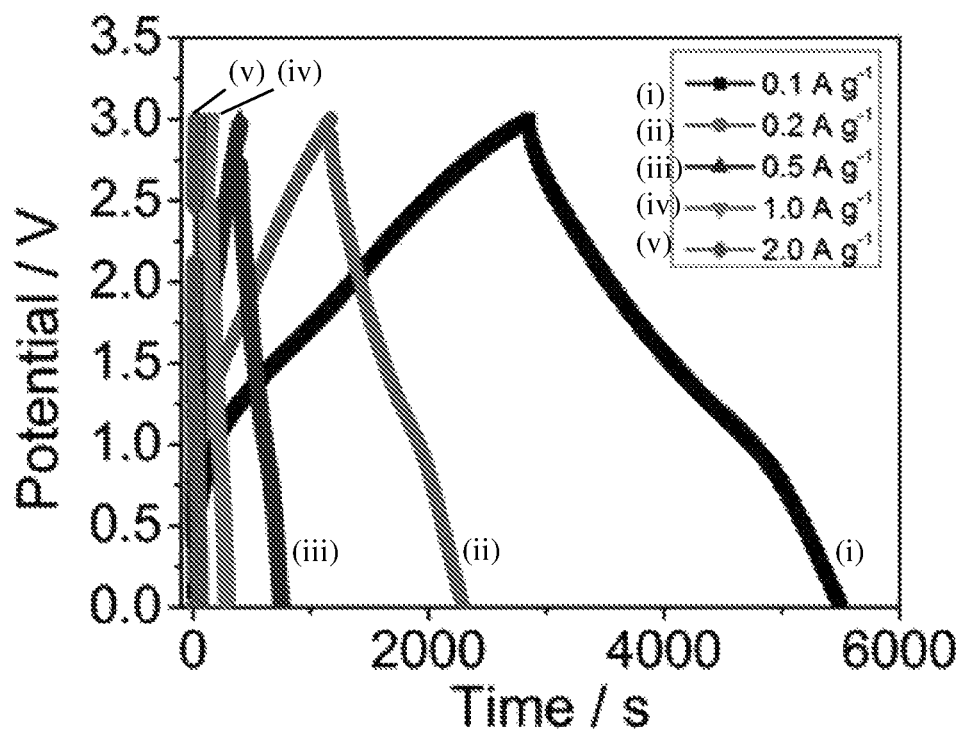
FIG. 6 shows (A) galvanostatic charge-discharge tests of Ti doped T-$Nb_2O_5$//PANI-SWCNT supercapacitor device at (i) 0.1 A g$^{-1}$; (ii) 0.2 A g$^{-1}$; (iii) 0.5 A g$^{-1}$; (iv) 1.0 A g$^{-1}$; and (v) 2.0 A g$^{-1}$; (B) galvanostatic charge-discharge tests of Ti doped T-$Nb_2O_5$//activated carbon supercapacitor device at (i) 0.1 A g$^{-1}$; (ii) 0.2 A g$^{-1}$; (iii) 0.5 A g$^{-1}$; (iv) 1.0 A g$^{-1}$; and (v) 2.0 A g$^{-1}$; (C) Ragone plot of Ti doped T-$Nb_2O_5$//PANI-SWCNT supercapacitor device (■), $Nb_2O_5$//activated carbon (Δ), $TiO_2$(B)//activated carbon (●), $Li_4Ti_5O_{12}$/CNF//activated carbon (☆) and hard carbon//activated carbon (▲); (D) relationship between capacitance retention and cycle number for T-$Nb_2O_5$//PANI-SWCNT supercapacitor device.
Figure 6:
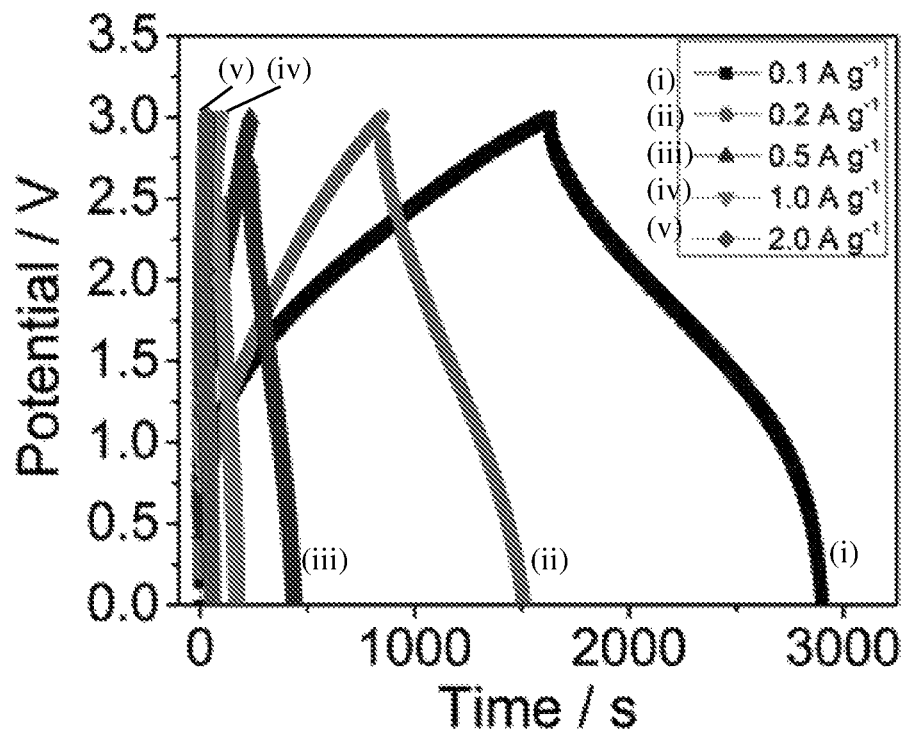
Figure 6:
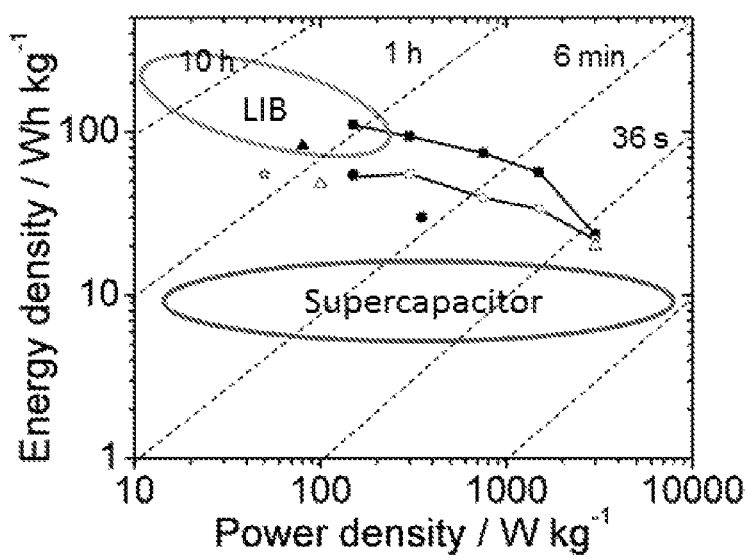
Figure 6:
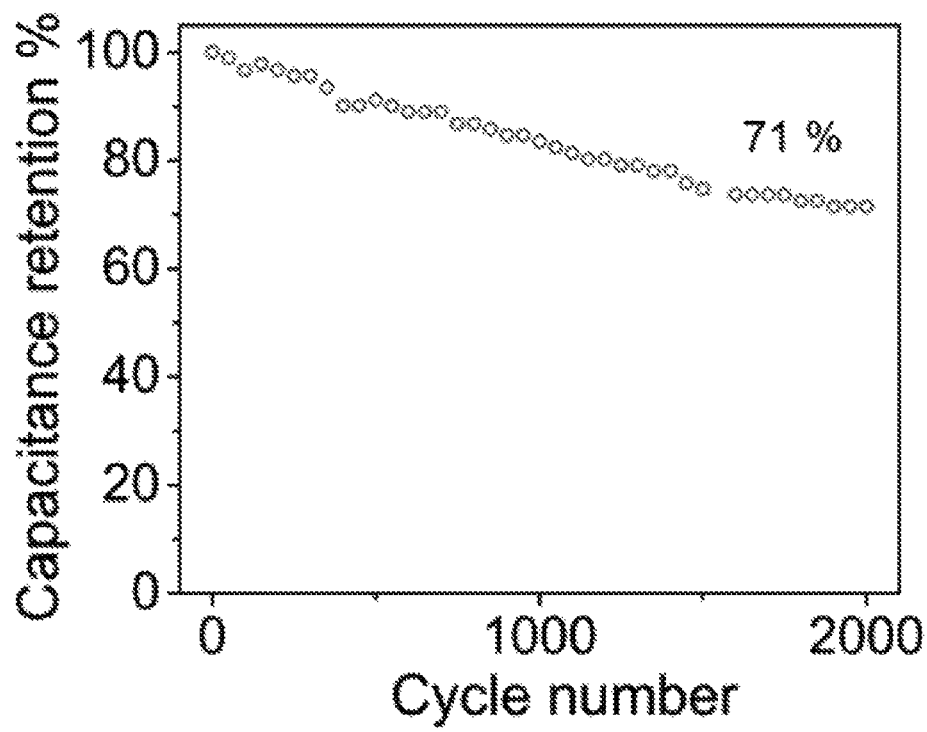

The galvanostatic charge-discharge tests of devices were performed from 0 V to 3 V at various current densities, as shown in FIGS. 6(A) and (B). The charge-discharge curves of Ti doped T-Nb$_2$O$_5$//PANI-SWCNT and Ti doped T-Nb$_2$O$_5$//activated carbon devices both show well symmetric triangular shapes, which indicate well-defined capacitive energy storage behavior with balanced charge storage at both electrodes.

The specific capacitance of the supercapacitor device was calculated based on Equation 4, where M is the total mass of positive and negative electrodes and $\Delta V$ is the device operation window. The specific capacitance of device was calculated to be 88.27 F g$^{-1}$ at 0.1 A g$^{-1}$, corresponding to the energy density of 110.3 Wh kg$^{-1}$ @ 150 W kg$^{-1}$. Meanwhile, the capacitance maintained 18.93 F g$^{-1}$ at 2 A g$^{-1}$, which equal to 23.6 Wh kg$^{-1}$ @ 3 kW kg$^{-1}$. For Ti doped T-Nb$_2$O$_5$//activated carbon device, the specific capacitance was 43.33 F g$^{-1}$ at 0.1 A g$^{-1}$. The energy density is only 52.9 Wh kg$^{-1}$ @ 150 W kg$^{-1}$. From the results obtained, it was evident that the application of PANI-SWCNT was beneficial for enhancing the energy density of non-aqueous LIC.

To further illustrate the characteristics of the devices, the relationship between energy density and power density was plotted in the Ragone plot in FIG. 6(C). The energy density of this device was comparable with some lithium ion batteries. Meanwhile, the power density was greatly improved as compared to batteries. Besides, the energy density of supercapacitor device was greatly enhanced by combining two high energy density materials at positive electrode and negative electrode. As a result, the device demonstrated much improved energy density as compared to state of the art organic electrolyte supercapacitor devices using activated carbon on one electrode, such as mesoporous Nb$_2$O$_5$//activated carbon (Δ, 48 Wh kg$^{-1}$), TiO$_2$(B)//activated carbon (●, 55 Wh kg$^{-1}$), Li$_4$Ti$_5$O$_{12}$/CNF//activated carbon (☆, 55 Wh kg$^{-1}$), and hard carbon//activated carbon (▲, 82 Wh kg$^{-1}$).

Cycling stability is another important parameter for supercapacitors. As shown in FIG. 6(D), after 2000 cycles, the capacitance of device remained at 71%. This value was not yet satisfactory for practical application. The fast degradation of capacitance may partly come from the relative poor stability of PANT due to shrinking and swelling during cycling. The inventors believe the improvement in PANT's cycling stability will be beneficial for achieving better device cycling performance. Nevertheless, more future work in improving the cycling stability is highly desirable.

In conclusion, a new electrode combination for LIC using Ti doped T-Nb$_2$O$_5$ and PANI-SWCNT was developed. Ti doping in T-Nb$_2$O$_5$ increased the capacity, rate capability as well as the cycling stability. The origin of such improvement may come from reduced charge transfer resistance and better electron conductivity during Li insertion. Apart from Ti doped T-Nb$_2$O$_5$, PANI-SWNT was developed with high capacitance and good rate capability. As a result, Ti doped T-Nb$_2$O$_5$//PANI-SWCNT showed elevated energy density. Stability of supercapacitor device may be further improved. The idea of replacing carbon material in LIC may be beneficial for developing future high energy density non-aqueous supercapacitors.

Currently, there is no similar research work or patent on this proposed device.

The proposed device may be useful in application areas such as, but not limited to, load-leveling markets, for example output smoothing in wind mill, solar panel; energy storage in micro grid; power regeneration and power assistance in transportation, for example, provide acceleration and harvest deceleration energy from vehicles; backup power in factories, data centers, medical centers; and power source in electrical vehicles, personal electronics products.

The device disclosed herein may decrease the space cost and financial cost (dollars per Wh kg$^{-1}$) for the customers. Meanwhile, the proposed technology may also impact on a few batteries dominated fields, such as electrical vehicles, and personal electronics devices. The high energy density supercapacitor may provide high rate charge speed and reduce the charge time without sacrificing products' operation time. Scientifically, the proposed approach may tackle a few critical obstacles haunting the $Nb_2O_5$ and PANI materials, such as long term stability issues of $Nb_2O_5$ and PANI during cycling. Further, high rate charge/discharge properties of $Nb_2O_5$ and PANI with high capacity may be obtained.

Example 7: Orthorhombic Phase $Nb_2O_5$

Figure 8:
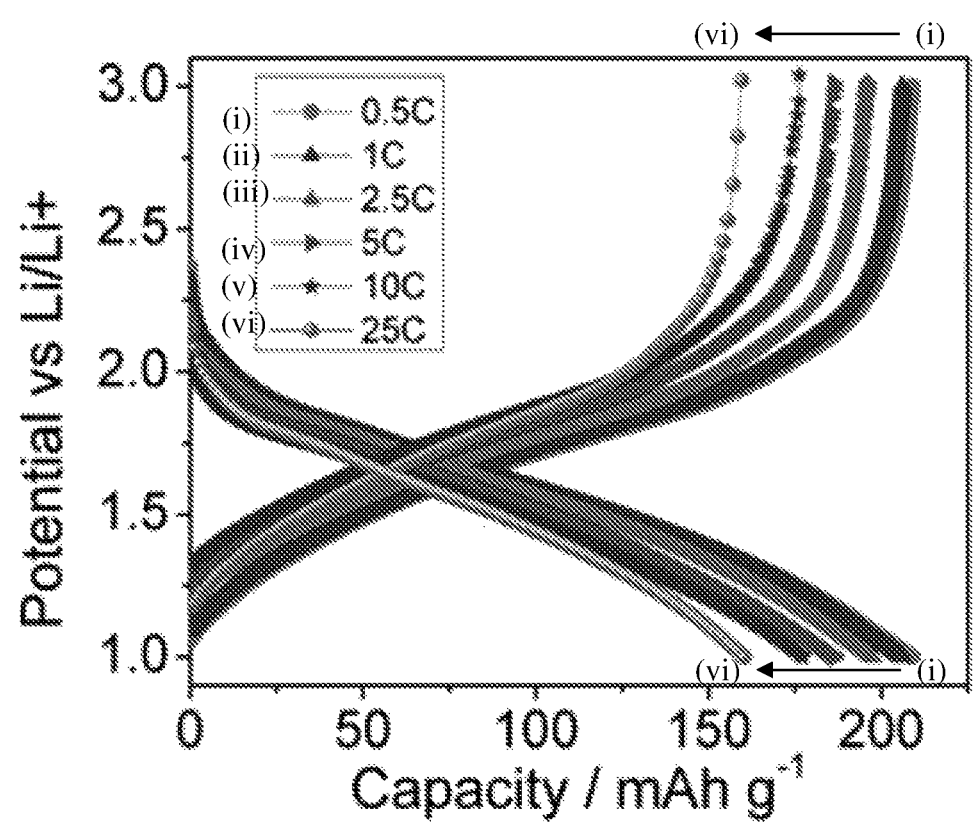
FIG. 8 shows (a) charge-discharge curves of sample T-$Nb_2O_5$ at different current densities of (i) 0.5 C, (ii) 1 C, (iii) 2.5 C, (iv) 5 C, (v) 10 C, and (vi) 25 C; (b) charge-discharge curves of sample carbon coated orthorhombic niobium oxide (C-T-$Nb_2O_5$) at different current densities of (i) 0.5 C, (ii) 1 C, (iii) 2 C, (iv) 5 C, (v) 10 C, and (vi) 25 C; (c) relationships between cycle number and capacity retention of sample T-$Nb_2O_5$ and sample C-T-$Nb_2O_5$ at a charge-discharge current density of 5 C, data recorded after rate capability tests.
Figure 8:
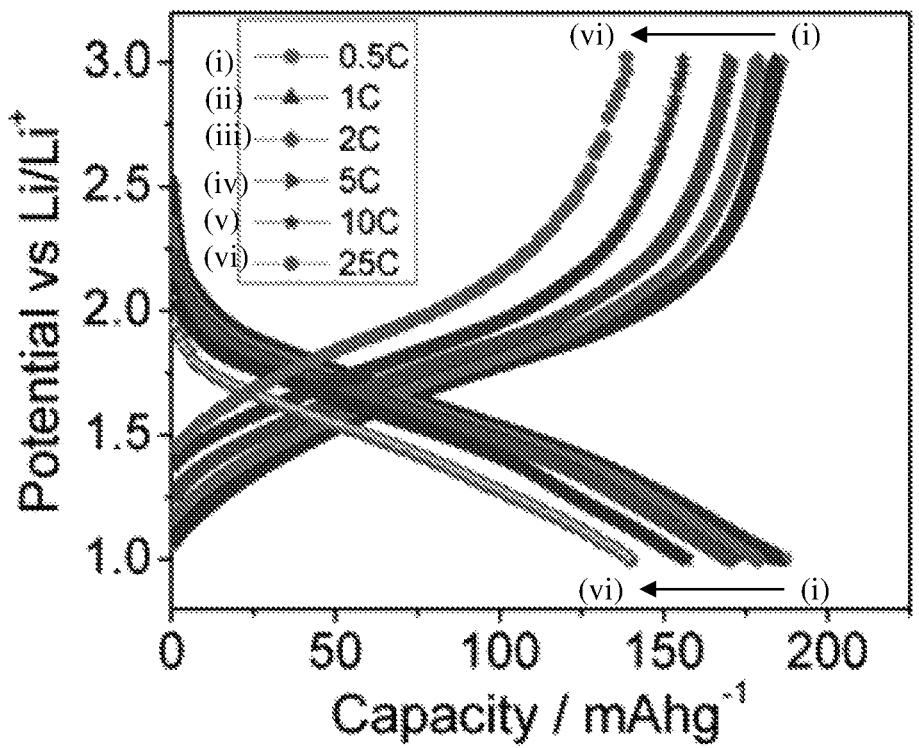
Figure 8:
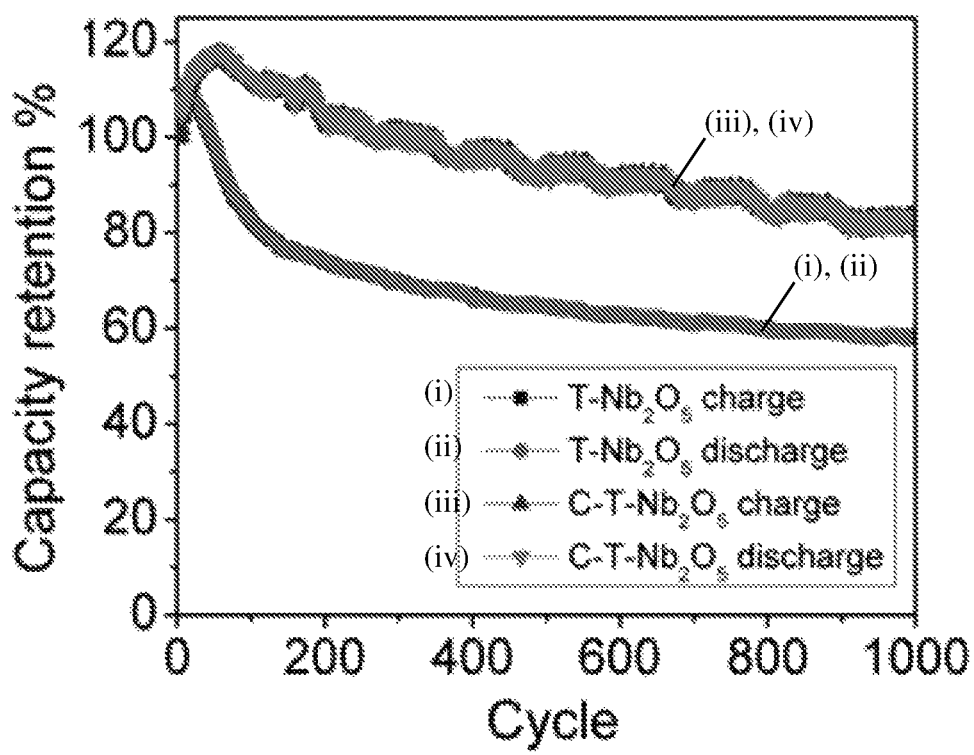
Figure 9:
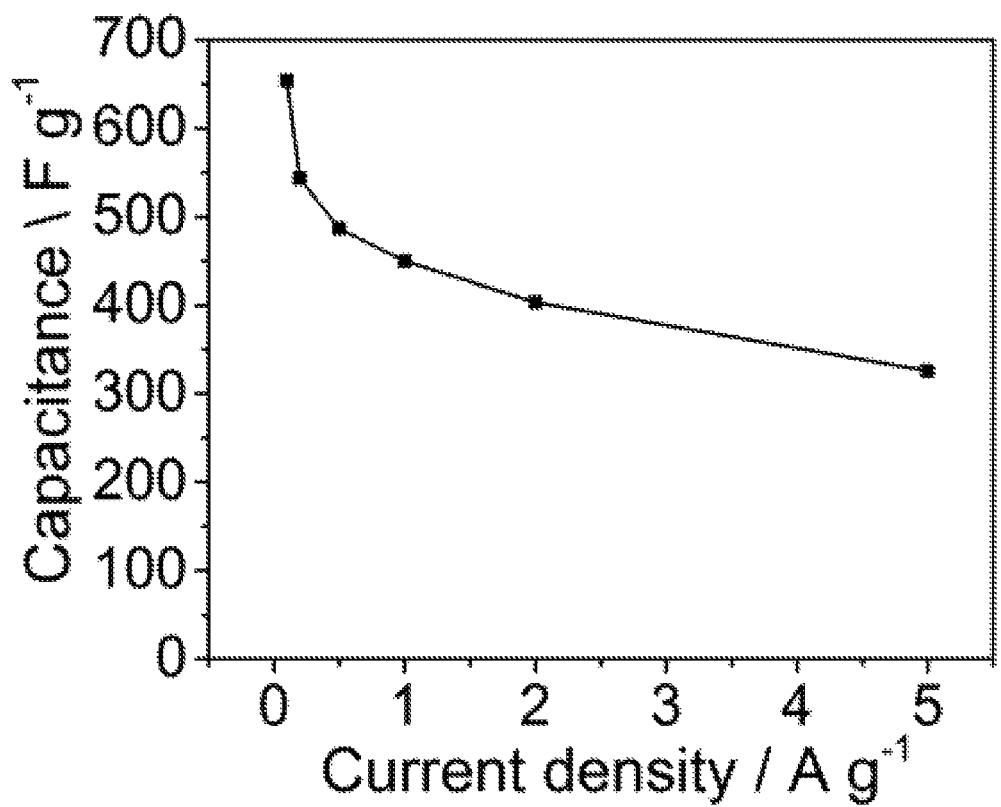
FIG. 9 shows the relationship between specific capacitances and current densities of a polyaniline-carbon composite material.

Orthorhombic phase $Nb_2O_5$ was synthesis by hydrothermal method followed with annealing. The sample was labeled as T-$Nb_2O_5$. A thin layer of carbon coating was coated on the T-$Nb_2O_5$, the carbon coated sample was labeled as C-T-$Nb_2O_5$. The electrochemical studies of T-$Nb_2O_5$ and C-T-$Nb_2O_5$ were carried out in coin cells with Li foil as both counter and reference electrode. The charge-discharge curves of sample T-$Nb_2O_5$ are shown in FIG. 8(A). The T-$Nb_2O_5$ sample attained a reversible capacity of 209.1 mAh g$^{-1}$ at 0.5 C, which was slightly larger than the theoretical capacity of 200 mAh g$^{-1}$. The slight increase of reversible capacity may be due to the reversible formation of Li species at low voltage. More significantly, the reversible capacity was able to maintain 160.4 mAh g$^{-1}$ (76.4% retention), even at a high charge-discharge rate of 25° C. On the other hand, the charge-discharge curves of sample C-T-$Nb_2O_5$ are shown in FIG. 8(B). Due to the inactive carbon coating at testing range, this sample showed a lower capacity of 186.8 mAh g$^{-1}$ at 0.5° C., and maintained 140 mAh g$^{-1}$ at 25 C (75% retention). Similar rate performance may be observed, which may indicate that the fast Li$^+$ intercalation/deintercalation process was not affected by the carbon coating.

The long term cycling stability was critical in device application. Especially in supercapacitor application, at least 1000 cycles would be necessary to demonstrate the reliability of materials. However, $Nb_2O_5$ was treated as a battery material in previous reports, in which only less than 100 cycles at low current density were demonstrated. To demonstrate the stability for fast charge-discharge application, the galvanostatic charge-discharge test of preactivated cell was carried out at 1 A g$^{-1}$ (5 C) for 1000 cycles. As shown in FIG. 8(C), the capacity of sample T-$Nb_2O_5$ increased slightly at first 40 cycles then experienced a dramatic fading within the next 160 cycles (32% loss). At last, 53.5% retention could be achieved after 1,000 cycles. Such capacity fading characteristic was also previously reported for pseudo hexagonal $Nb_2O_5$ (tested up to 500 cycles). On the other hand, the capacity of sample C-T-$Nb_2O_5$ showed much better stability, which maintained 82% after 1000 cycles.

Example 8: Electrochemical Property of PANI-Carbon Composite Material

PANT-carbon composite material can be tested from about 3 V to about 4 V vs Li/Li$^+$. There was a pair of redox peaks includes the conversion between the fully reduced leucoemeraldine base to the partially oxidized emeraldine and between emeraldine and pernigraniline. Galvanostatic charge-discharge tests were performed to determine capacitance of the PANT-carbon composite material. The specific capacitance of PANI-SWCNT composite material is 650 F g$^{-1}$ @ 0.1 A g$^{-1}$, while it maintained 300 F g$^1$ @ 5.0 A g$^{-1}$, showing good rate capability in organic electrolyte.

The energy storage devices may be commercialized in various size and modules. Scaling up is an important process, not only to production, but also to application. Current lab study of proposed supercapacitor devices was demonstrated in small device level (coin cell). A cutting edge electrochemical energy storage device according to embodiments disclosed herein may be great value for occupying the current markets in energy storage, transportation and electronics.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method for preparing a metal oxide nanostructured material doped with a dopant metal, the method comprising:
    a) providing an aqueous reagent comprising (i) a soluble metal oxalate, and/or (ii) oxalic acid and a metal oxide precursor,
    b) adding a buffering agent and a substance comprising the dopant metal to the aqueous reagent to form a mixture,
    c) heating the mixture under hydrothermal conditions to obtain the metal oxide nanostructured material doped with the dopant metal,
    d) drying the metal oxide nanostructured material doped with the dopant metal, and
    e) annealing metal oxide nanostructured material doped with the dopant metal at a temperature in the range of about 550° C. to about 650° C. after drying, wherein the annealed metal oxide nanostructured material doped with the dopant metal comprises an orthorhombic crystalline structure.

2. The method according to claim 1, wherein metal of the metal oxide nanostructured material is selected from the group consisting of niobium, titanium, vanadium, combinations thereof, and alloys thereof.

3. The method according to claim 1, wherein the soluble metal oxalate is selected from the group consisting of niobium (V) oxalate, titanium oxalate, vanadium oxalate, ammonium niobium (V) oxalate, ammonium titanium oxalate, ammonium vanadium oxalate, potassium titanium oxide oxalate, and mixtures thereof.

4. The method according to claim 1, wherein the metal oxide precursor is selected from the group consisting of metal halides, metal sulfates, metal acetates, metal alkoxides, metal nitrates, and combinations thereof.

5. The method according to claim 1, wherein the metal oxide precursor comprises a metal halide.

6. The method according to claim 1, wherein concentration of the metal ion from the metal oxide precursor in the aqueous reagent is in the range of about 20 mM to about 0.1 M.

7. The method according to claim 1, wherein molar ratio of oxalic acid to the metal ion from the metal oxide precursor in the aqueous reagent is in the range of about 8:1 to about 2:1.

8. The method according to claim 1, wherein the buffering agent is selected from the group consisting of hexamethylenetetramine, urea, and combinations thereof.

9. The method according to claim 1, wherein heating the mixture under hydrothermal conditions comprises heating the mixture in an autoclave at a temperature in the range of about 180° C. to about 200° C.

10. The method according to claim 1, wherein drying comprises drying the metal oxide nanostructured material doped with the dopant metal at a temperature in the range of about 40° C. to about 100° C.

11. The method according to claim 1, wherein annealing comprises annealing the metal oxide nanostructured material doped with the dopant metal in air.

12. The method according to claim 1, wherein the dopant metal is selected from the group consisting of titanium, vanadium, nickel, cobalt, alloys thereof, and combinations thereof.

13. The method according to claim 1, wherein atomic ratio of the dopant metal and the metal of the metal oxide precursor in the aqueous reagent is about 1:5 or less.

14. The method according to claim 1, further comprising forming a layer of carbon on the metal oxide nanostructured material doped with the dopant metal.

15. A metal oxide nanostructured material doped with a dopant metal prepared by a method comprising
   a) providing an aqueous reagent comprising (i) a soluble metal oxalate, and/or (ii) oxalic acid and a metal oxide precursor,
   b) adding a buffering agent and a substance comprising the dopant metal to the aqueous reagent to form a mixture,
   c) heating the mixture under hydrothermal conditions to obtain the metal oxide nanostructured material doped with the dopant metal,
   d) drying the metal oxide nanostructured material doped with the dopant metal, and
   e) annealing the metal oxide nanostructured material doped with the dopant metal at a temperature in the range of about 550° C. to about 650° C. after drying, wherein the annealed metal oxide nanostructured material doped with the dopant metal comprises an orthorhombic crystalline structure.

16. An electrochemical cell comprising an anode and a cathode, wherein the anode comprises a metal oxide nanostructured material doped with a dopant metal prepared by a method comprising a) providing an aqueous reagent comprising (i) a soluble metal oxalate, and/or (ii) oxalic acid and a metal oxide precursor, b) adding a buffering agent and a substance comprising the dopant metal to the aqueous reagent to form a mixture, c) heating the mixture under hydrothermal conditions to obtain the metal oxide nanostructured material doped with the dopant metal, d) drying the metal oxide nanostructured material doped with the dopant metal, and e) annealing the metal oxide nanostructured material doped with the dopant metal at a temperature in the range of about 550° C. to about 650° C. after drying, wherein the annealed metal oxide nanostructured material doped with the dopant metal comprises an orthorhombic crystalline structure, and the cathode comprises a composite of an electrically conducting polymer and a carbon-based material.

17. The electrochemical cell according to claim 16, wherein the electrically conducting polymer is a redox active conjugated conducting polymer.

18. The electrochemical cell according to claim 16, wherein the carbon-based material comprises one or more single-walled carbon nanotubes, and wherein the electrically conducting polymer forms a uniform layer around each of the single-walled carbon nanotubes.

* * * * *

UNITED STATES PATENT AND TRADEMARK OFFICE
CERTIFICATE OF CORRECTION

PATENT NO.       : 10,650,984 B2  
APPLICATION NO.  : 15/537710  
DATED            : May 12, 2020  
INVENTOR(S)      : Pooi See Lee Page 1 of 1

It is certified that error appears in the above-identified patent and that said Letters Patent is hereby corrected as shown below:

On the Title Page

On page 2, Column 2, under section References Cited/Other Publications Line 50: insert:
-- Wang et al,. "Orthorhombic niobium oxide nanowires for next generation hybrid supercapacitor device," Nano Energy 11: 765-772, 2014. --

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*